(12) United States Patent
Backlund et al.

(10) Patent No.: US 10,821,517 B2
(45) Date of Patent: *Nov. 3, 2020

(54) APPARATUS, METHOD, AND COMPUTER PROGRAM PRODUCT FOR FUSING A WORKPIECE

(71) Applicant: ARCAM AB, Moelndal (SE)

(72) Inventors: Johan Backlund, Onsala (SE); Tomas Lock, Vaestra Froelunda (SE)

(73) Assignee: Arcam AB, Moelndal (SE)

( * ) Notice: Subject to any disclaimer, the term of this patent is extended or adjusted under 35 U.S.C. 154(b) by 318 days.

This patent is subject to a terminal disclaimer.

(21) Appl. No.: 16/040,841

(22) Filed: Jul. 20, 2018

(65) Prior Publication Data

US 2018/0345377 A1 Dec. 6, 2018

Related U.S. Application Data

(60) Division of application No. 15/921,401, filed on Mar. 14, 2018, now Pat. No. 10,058,921, which is a
(Continued)

(51) Int. Cl.
*B23K 15/00* (2006.01)
*B23K 26/342* (2014.01)
(Continued)

(52) U.S. Cl.
CPC ........ *B22F 3/1055* (2013.01); *B23K 15/0013* (2013.01); *B23K 15/0086* (2013.01);
(Continued)

(58) Field of Classification Search
CPC ........ B23K 15/0046–0093; B23K 26/21–302; B23K 26/34–342
See application file for complete search history.

(56) References Cited

U.S. PATENT DOCUMENTS 2,264,968 A 12/1941 De Forest
2,323,715 A 7/1943 Kuehni
(Continued)

FOREIGN PATENT DOCUMENTS

CA 2860188 A1 6/2006
CN 101607311 A 12/2009
(Continued)

OTHER PUBLICATIONS

Cheah, Chi-Mun, et al., "Automatic Algorithm for Generating Complex Polyhedral Scaffold Structure for Tissue Engineering", Tissue Engineering, 2004, pp. 595-610, vol. 10, No. 3/4, XP002691483.
(Continued)

*Primary Examiner* — Michael A Laflame, Jr.
(74) *Attorney, Agent, or Firm* — Dinsmore & Shohl LLP

(57) ABSTRACT

Provided is an apparatus that includes a high energy beam configured to make a first weld at a first position on a workpiece; at least one deflection lens configured to deflect the high energy beam so as to cause the high energy beam to make a second weld at a second position; at least one focusing lens configured to focus the high energy beam; at least one astigmatism lens; and at least one controller. The controller is configured to shape the high energy beam so that the shape of the high energy beam on the workpiece is longer in a direction parallel to a deflection direction of the high energy beam than in a direction perpendicular to the deflection direction of the high energy beam. A length ratio is varying as a function of the power of the energy beam, while the width in the perpendicular direction is constant.

17 Claims, 9 Drawing Sheets

Related U.S. Application Data continuation of application No. 15/466,212, filed on Mar. 22, 2017, now Pat. No. 9,950,367, which is a division of application No. 14/636,607, filed on Mar. 3, 2015, now abandoned.

(60) Provisional application No. 61/974,304, filed on Apr. 2, 2014.

(51) Int. Cl.

| | | |
|---|---|---|
| *B23K 26/34* | (2014.01) | |
| *B22F 3/105* | (2006.01) | |
| *B23K 26/06* | (2014.01) | |
| *B23K 26/073* | (2006.01) | |
| *G02B 27/09* | (2006.01) | |
| *B29C 64/153* | (2017.01) | |
| *B33Y 10/00* | (2015.01) | |
| *B33Y 30/00* | (2015.01) | |
| *B33Y 50/02* | (2015.01) | |
| *B28B 1/00* | (2006.01) | |
| *B28B 17/00* | (2006.01) | |
| *B23K 26/70* | (2014.01) | |
| *B23K 15/02* | (2006.01) | |
| *B29K 105/00* | (2006.01) | |

(52) U.S. Cl.
CPC .......... *B23K 15/02* (2013.01); *B23K 26/0643* (2013.01); *B23K 26/0648* (2013.01); *B23K 26/0732* (2013.01); *B23K 26/0736* (2013.01); *B23K 26/0738* (2013.01); *B23K 26/342* (2015.10); *B23K 26/702* (2015.10); *B28B 1/001* (2013.01); *B28B 17/0081* (2013.01); *B29C 64/153* (2017.08); *B33Y 10/00* (2014.12); *B33Y 30/00* (2014.12); *B33Y 50/02* (2014.12); *G02B 27/0911* (2013.01); *B22F 2003/1056* (2013.01); *B22F 2003/1057* (2013.01); *B29K 2105/251* (2013.01); *Y02P 10/25* (2015.11)

(56) References Cited

U.S. PATENT DOCUMENTS

| | | |
|---|---|---|
| 3,634,644 A | 1/1972 | Ogden et al. |
| 3,838,496 A | 10/1974 | Kelly |
| 3,882,477 A | 5/1975 | Mueller |
| 3,906,229 A | 9/1975 | Demeester et al. |
| 3,908,124 A | 9/1975 | Rose |
| 4,314,134 A | 2/1982 | Schumacher et al. |
| 4,348,576 A | 9/1982 | Anderl et al. |
| 4,352,565 A | 10/1982 | Rowe et al. |
| 4,401,719 A | 8/1983 | Kobayashi et al. |
| 4,541,055 A | 9/1985 | Wolfe et al. |
| 4,651,002 A | 3/1987 | Anno |
| 4,818,562 A | 4/1989 | Arcella et al. |
| 4,863,538 A | 9/1989 | Deckard |
| 4,888,490 A | 12/1989 | Bass et al. |
| 4,927,992 A | 5/1990 | Whitlow et al. |
| 4,958,431 A | 9/1990 | Clark et al. |
| 4,988,844 A | 1/1991 | Dietrich et al. |
| 5,118,192 A | 6/1992 | Chen et al. |
| 5,135,695 A | 8/1992 | Marcus |
| 5,167,989 A | 12/1992 | Dudek et al. |
| 5,182,170 A | 1/1993 | Marcus et al. |
| 5,204,055 A | 4/1993 | Sachs et al. |
| 5,247,560 A | 9/1993 | Hosokawa et al. |
| 5,393,482 A | 2/1995 | Benda et al. |
| 5,483,036 A | 1/1996 | Giedt et al. |
| 5,508,489 A | 4/1996 | Benda et al. |
| 5,511,103 A | 4/1996 | Hasegawa |
| 5,562,331 A | 10/1996 | Spykerman et al. |
| 5,595,670 A | 1/1997 | Mombo Caristan |
| 5,647,931 A | 7/1997 | Retallick et al. |
| 5,753,274 A | 5/1998 | Wilkening et al. |
| 5,837,960 A | 11/1998 | Lewis et al. |
| 5,876,550 A | 3/1999 | Feygin et al. |
| 5,904,890 A | 5/1999 | Lohner et al. |
| 5,932,290 A | 8/1999 | Lombardi et al. |
| 6,046,426 A | 4/2000 | Jeantette et al. |
| 6,162,378 A | 12/2000 | Bedal et al. |
| 6,204,469 B1 | 3/2001 | Fields et al. |
| 6,419,203 B1 | 7/2002 | Dang |
| 6,537,052 B1 | 3/2003 | Adler |
| 6,554,600 B1 | 4/2003 | Hofmann et al. |
| 6,583,379 B1 | 6/2003 | Meiners et al. |
| 6,676,892 B2 | 1/2004 | Das et al. |
| 6,724,001 B1 | 4/2004 | Pinckney et al. |
| 6,746,506 B2 | 6/2004 | Liu et al. |
| 6,751,516 B1 | 6/2004 | Richardson |
| 6,764,636 B1 | 7/2004 | Allanic et al. |
| 6,811,744 B2 | 11/2004 | Keicher et al. |
| 6,815,636 B2 | 11/2004 | Chung et al. |
| 6,824,714 B1 | 11/2004 | Türck et al. |
| 7,003,864 B2 | 2/2006 | Dirscherl |
| 7,020,539 B1 | 3/2006 | Kovacevic et al. |
| 7,165,498 B2 | 1/2007 | Mackrill et al. |
| 7,204,684 B2 | 4/2007 | Ederer et al. |
| 7,291,002 B2 | 11/2007 | Russell et al. |
| 7,452,500 B2 | 11/2008 | Uckelmann |
| 7,454,262 B2 | 11/2008 | Larsson et al. |
| 7,537,722 B2 | 5/2009 | Andersson et al. |
| 7,540,738 B2 | 6/2009 | Larsson et al. |
| 7,569,174 B2 | 8/2009 | Ruatta et al. |
| 7,635,825 B2 | 12/2009 | Larsson |
| 7,686,605 B2 | 3/2010 | Perret et al. |
| 7,696,501 B2 | 4/2010 | Jones |
| 7,713,454 B2 | 5/2010 | Larsson |
| 7,754,135 B2 | 7/2010 | Abe et al. |
| 7,799,253 B2 | 9/2010 | Höchsmann et al. |
| 7,871,551 B2 | 1/2011 | Wallgren et al. |
| 8,021,138 B2 | 9/2011 | Green |
| 8,083,513 B2 | 12/2011 | Montero-Escuder et al. |
| 8,137,739 B2 | 3/2012 | Philippi et al. |
| 8,187,521 B2 | 5/2012 | Larsson et al. |
| 8,308,466 B2 | 11/2012 | Ackelid et al. |
| 8,992,816 B2 | 3/2015 | Jonasson et al. |
| 9,073,265 B2 | 7/2015 | Snis |
| 9,079,248 B2 | 7/2015 | Ackelid |
| 9,126,167 B2 | 9/2015 | Ljungblad |
| 9,254,535 B2 | 2/2016 | Buller et al. |
| 9,310,188 B2 | 4/2016 | Snis |
| 9,505,172 B2 | 11/2016 | Ljungblad |
| 9,550,207 B2 | 1/2017 | Ackelid |
| 9,802,253 B2 | 10/2017 | Jonasson |
| 9,950,367 B2 | 4/2018 | Backlund et al. |
| 10,071,422 B2 | 9/2018 | Buller et al. |
| 2002/0104973 A1 | 8/2002 | Kerekes |
| 2002/0152002 A1 | 10/2002 | Lindemann et al. |
| 2002/0195747 A1 | 12/2002 | Hull et al. |
| 2003/0043360 A1 | 3/2003 | Farnworth |
| 2003/0133822 A1 | 7/2003 | Harryson |
| 2003/0205851 A1 | 11/2003 | Laschutza et al. |
| 2004/0012124 A1 | 1/2004 | Li et al. |
| 2004/0026807 A1 | 2/2004 | Andersson et al. |
| 2004/0084814 A1 | 5/2004 | Boyd et al. |
| 2004/0104499 A1 | 6/2004 | Keller |
| 2004/0148048 A1 | 7/2004 | Farnworth |
| 2004/0173496 A1 | 9/2004 | Srinivasan |
| 2004/0173946 A1 | 9/2004 | Pfeifer et al. |
| 2004/0204765 A1 | 10/2004 | Fenning et al. |
| 2004/0217095 A1 | 11/2004 | Herzog |
| 2005/0173380 A1 | 8/2005 | Carbone |
| 2005/0186538 A1 | 8/2005 | Uckelmann |
| 2005/0282300 A1 | 12/2005 | Yun et al. |
| 2006/0108712 A1 | 5/2006 | Mattes |
| 2006/0138325 A1 | 6/2006 | Choi |
| 2006/0145381 A1 | 7/2006 | Larsson |
| 2006/0147332 A1 | 7/2006 | Jones et al. |
| 2006/0157892 A1 | 7/2006 | Larsson |
| 2006/0180957 A1 | 8/2006 | Hopkinson et al. |
| 2006/0284088 A1 | 12/2006 | Fukunaga et al. |

(56) References Cited

U.S. PATENT DOCUMENTS

| | | |
|---|---|---|
| 2007/0074659 A1 | 4/2007 | Wahlstrom |
| 2007/0175875 A1 | 8/2007 | Uckelmann et al. |
| 2007/0179655 A1 | 8/2007 | Farnworth |
| 2007/0182289 A1 | 8/2007 | Kigawa et al. |
| 2007/0298182 A1 | 12/2007 | Perret et al. |
| 2008/0236738 A1 | 10/2008 | Lo et al. |
| 2009/0017219 A1 | 1/2009 | Paasche et al. |
| 2009/0152771 A1 | 6/2009 | Philippi et al. |
| 2009/0206056 A1 | 8/2009 | Xu et al. |
| 2010/0007062 A1 | 1/2010 | Larsson et al. |
| 2010/0260410 A1 | 10/2010 | Taminger et al. |
| 2010/0305743 A1 | 12/2010 | Larsson |
| 2010/0310404 A1 | 12/2010 | Ackelid |
| 2010/0316856 A1 | 12/2010 | Currie et al. |
| 2011/0061591 A1 | 3/2011 | Stecker |
| 2011/0114839 A1 | 5/2011 | Stecker et al. |
| 2011/0133367 A1 | 6/2011 | Weidinger et al. |
| 2011/0240607 A1 | 10/2011 | Stecker et al. |
| 2011/0241575 A1 | 10/2011 | Caiafa et al. |
| 2011/0293770 A1 | 12/2011 | Ackelid et al. |
| 2011/0293771 A1 | 12/2011 | Oberhofer et al. |
| 2011/0309554 A1 | 12/2011 | Liska et al. |
| 2011/0316178 A1 | 12/2011 | Uckelmann |
| 2012/0100031 A1 | 4/2012 | Ljungblad |
| 2012/0164322 A1 | 6/2012 | Teulet et al. |
| 2012/0183701 A1 | 7/2012 | Pilz et al. |
| 2012/0193530 A1 | 8/2012 | Parker et al. |
| 2012/0211155 A1 | 8/2012 | Wehning et al. |
| 2012/0223059 A1 | 9/2012 | Ackelid |
| 2012/0225210 A1 | 9/2012 | Fruth |
| 2012/0237745 A1 | 9/2012 | Dierkes et al. |
| 2012/0266815 A1 | 10/2012 | Brunermer |
| 2013/0055568 A1 | 3/2013 | Dusel et al. |
| 2013/0162134 A1 | 6/2013 | Mattausch et al. |
| 2013/0186514 A1 | 7/2013 | Zhuang et al. |
| 2013/0216959 A1 | 8/2013 | Tanaka et al. |
| 2013/0233846 A1 | 9/2013 | Jakimov et al. |
| 2013/0256286 A1 | 10/2013 | Sercel et al. |
| 2013/0264750 A1 | 10/2013 | Hofacker et al. |
| 2013/0270750 A1 | 10/2013 | Green |
| 2013/0278920 A1 | 10/2013 | Loewgren |
| 2013/0300286 A1 | 11/2013 | Ljungblad et al. |
| 2013/0343947 A1 | 12/2013 | Satzger et al. |
| 2014/0175708 A1 | 6/2014 | Echigo et al. |
| 2014/0271964 A1 | 9/2014 | Roberts, IV et al. |
| 2014/0301884 A1 | 10/2014 | Hellestam et al. |
| 2014/0308153 A1 | 10/2014 | Ljungblad |
| 2014/0314609 A1 | 10/2014 | Ljungblad et al. |
| 2014/0314964 A1 | 10/2014 | Ackelid |
| 2014/0348691 A1 | 11/2014 | Ljungblad et al. |
| 2014/0363327 A1 | 12/2014 | Holcomb |
| 2014/0367367 A1 | 12/2014 | Wood et al. |
| 2015/0004045 A1 | 1/2015 | Ljungblad |
| 2015/0050463 A1 | 2/2015 | Nakano et al. |
| 2015/0071809 A1 | 3/2015 | Nordkvist et al. |
| 2015/0086409 A1 | 3/2015 | Hellestam |
| 2015/0088295 A1 | 3/2015 | Hellestam |
| 2015/0130118 A1 | 5/2015 | Cheng et al. |
| 2015/0139849 A1 | 5/2015 | Pialot, Jr. et al. |
| 2015/0151490 A1 | 6/2015 | Jonasson et al. |
| 2015/0165524 A1 | 6/2015 | Ljungblad et al. |
| 2015/0165525 A1 | 6/2015 | Jonasson |
| 2015/0174658 A1 | 6/2015 | Ljungblad |
| 2015/0174695 A1 | 6/2015 | Elfstroem et al. |
| 2015/0251249 A1 | 9/2015 | Fager |
| 2015/0273622 A1 | 10/2015 | Manabe |
| 2015/0283610 A1 | 10/2015 | Ljungblad et al. |
| 2015/0283613 A1 | 10/2015 | Backlund et al. |
| 2015/0290710 A1 | 10/2015 | Ackelid |
| 2015/0306819 A1 | 10/2015 | Ljungblad |
| 2016/0052056 A1 | 2/2016 | Fager |
| 2016/0052079 A1 | 2/2016 | Ackelid |
| 2016/0054115 A1 | 2/2016 | Snis |
| 2016/0054121 A1 | 2/2016 | Snis |
| 2016/0054347 A1 | 2/2016 | Snis |
| 2016/0059314 A1 | 3/2016 | Ljungblad et al. |
| 2016/0129501 A1 | 5/2016 | Loewgren et al. |
| 2016/0167160 A1 | 6/2016 | Hellestam |
| 2016/0167303 A1 | 6/2016 | Petelet |
| 2016/0202042 A1 | 7/2016 | Snis |
| 2016/0202043 A1 | 7/2016 | Snis |
| 2016/0211116 A1 | 7/2016 | Lock |
| 2016/0236279 A1 | 8/2016 | Ashton et al. |
| 2016/0279735 A1 | 9/2016 | Hellestam |
| 2016/0282848 A1 | 9/2016 | Hellestam |
| 2016/0303687 A1 | 10/2016 | Ljungblad |
| 2016/0307731 A1 | 10/2016 | Lock |
| 2016/0311021 A1 | 10/2016 | Elfstroem et al. |
| 2017/0080494 A1 | 3/2017 | Ackelid |
| 2017/0087661 A1 | 3/2017 | Backlund et al. |
| 2017/0106443 A1 | 4/2017 | Karlsson |
| 2017/0106570 A1 | 4/2017 | Karlsson |
| 2017/0136541 A1 | 5/2017 | Fager |
| 2017/0136542 A1 | 5/2017 | Nordkvist et al. |
| 2017/0173691 A1 | 6/2017 | Jonasson |
| 2017/0189964 A1 | 7/2017 | Backlund et al. |
| 2017/0227417 A1 | 8/2017 | Snis |
| 2017/0227418 A1 | 8/2017 | Snis |
| 2017/0246684 A1 | 8/2017 | Hellestam |
| 2017/0246685 A1 | 8/2017 | Hellestam |
| 2017/0259338 A1 | 9/2017 | Ackelid |
| 2017/0282248 A1 | 10/2017 | Ljungblad et al. |
| 2017/0294288 A1 | 10/2017 | Lock |
| 2017/0341141 A1 | 11/2017 | Ackelid |
| 2017/0341142 A1 | 11/2017 | Ackelid |
| 2017/0348791 A1 | 12/2017 | Ekberg |
| 2017/0348792 A1 | 12/2017 | Fager |
| 2018/0009033 A1 | 1/2018 | Fager |
| 2018/0154444 A1 | 6/2018 | Jonasson |

FOREIGN PATENT DOCUMENTS

| | | |
|---|---|---|
| CN | 101635210 A | 1/2010 |
| CN | 201693176 U | 1/2011 |
| CN | 101607311 B | 9/2011 |
| CN | 203509463 U | 4/2014 |
| DE | 4231489 A1 | 3/1994 |
| DE | 19952998 A1 | 5/2001 |
| DE | 20305843 U1 | 7/2003 |
| DE | 10235434 A1 | 2/2004 |
| DE | 102005014483 A1 | 10/2006 |
| DE | 202008005417 U1 | 8/2008 |
| DE | 102007018601 A1 | 10/2008 |
| DE | 102007029052 A1 | 1/2009 |
| DE | 102008045778 A1 | 3/2009 |
| DE | 102008012064 A1 | 9/2009 |
| DE | 102010041284 A1 | 3/2012 |
| DE | 102011105045 B3 | 6/2012 |
| DE | 102013210242 A1 | 12/2014 |
| EP | 0289116 A1 | 11/1988 |
| EP | 0322257 A2 | 6/1989 |
| EP | 0688262 A1 | 12/1995 |
| EP | 1358994 A1 | 11/2003 |
| EP | 1418013 A1 | 5/2004 |
| EP | 1466718 A2 | 10/2004 |
| EP | 1486318 A2 | 12/2004 |
| EP | 1669143 A1 | 6/2006 |
| EP | 1683593 A2 | 7/2006 |
| EP | 1721725 A1 | 11/2006 |
| EP | 1752240 A1 | 2/2007 |
| EP | 1952932 A2 | 8/2008 |
| EP | 2011631 A1 | 1/2009 |
| EP | 2119530 A1 | 11/2009 |
| EP | 2281677 A1 | 2/2011 |
| EP | 2289652 A1 | 3/2011 |
| EP | 2292357 A1 | 3/2011 |
| EP | 2832474 A1 | 2/2015 |
| FR | 2980380 A1 | 3/2013 |
| JP | H04167987 A | 6/1992 |
| JP | H04167989 A | 6/1992 |
| JP | H05-171423 A | 7/1993 |
| JP | 2003241394 A | 8/2003 |
| JP | 2003245981 | 9/2003 |
| JP | 2009006509 A | 1/2009 |

(56) References Cited

FOREIGN PATENT DOCUMENTS

| | | |
|---|---|---|
| SE | 524467 C2 | 8/2004 |
| WO | WO 1993/08928 A1 | 5/1993 |
| WO | WO 1996/012607 A1 | 5/1996 |
| WO | WO 1997/37523 A2 | 10/1997 |
| WO | WO 2001/081031 A1 | 11/2001 |
| WO | WO 2001/85386 A2 | 11/2001 |
| WO | WO 2002/008653 A1 | 1/2002 |
| WO | WO 2004/007124 A1 | 1/2004 |
| WO | WO 2004/043680 A2 | 5/2004 |
| WO | WO 2004/054743 A1 | 7/2004 |
| WO | WO 2004/056511 A1 | 7/2004 |
| WO | WO 2004/106041 A2 | 12/2004 |
| WO | WO 2004/108398 A1 | 12/2004 |
| WO | WO 2006/091097 A2 | 8/2006 |
| WO | WO 2006/121374 A1 | 11/2006 |
| WO | WO 2007/112808 A1 | 10/2007 |
| WO | WO 2007/147221 A1 | 12/2007 |
| WO | WO 2008/013483 A1 | 1/2008 |
| WO | WO 2008/057844 A1 | 5/2008 |
| WO | WO 2008/074287 A1 | 6/2008 |
| WO | WO 2008/125497 A1 | 10/2008 |
| WO | WO 2008/147306 A1 | 12/2008 |
| WO | WO 2009/000360 A1 | 12/2008 |
| WO | WO 2009/072935 A1 | 6/2009 |
| WO | WO 2009/084991 A1 | 7/2009 |
| WO | WO 2010/095987 A1 | 8/2010 |
| WO | WO 2010/125371 A1 | 11/2010 |
| WO | WO 2011/008143 A1 | 1/2011 |
| WO | WO 2011/011818 A1 | 2/2011 |
| WO | WO 2011/030017 A1 | 3/2011 |
| WO | WO 2011/060312 A2 | 5/2011 |
| WO | WO 2012/102655 A1 | 8/2012 |
| WO | WO 2013/092997 A1 | 6/2013 |
| WO | WO 2013/098050 A1 | 7/2013 |
| WO | WO 2013/098135 A1 | 7/2013 |
| WO | WO 2013/159811 A1 | 10/2013 |
| WO | WO 2013/167194 A1 | 11/2013 |
| WO | WO 2013/178825 A2 | 12/2013 |
| WO | WO 2014/071968 A1 | 5/2014 |
| WO | WO 2014/092651 A1 | 6/2014 |
| WO | WO 2014/095200 A1 | 6/2014 |
| WO | WO 2014/095208 A1 | 6/2014 |
| WO | WO 2014/195068 A1 | 12/2014 |
| WO | WO 2015/032590 A2 | 3/2015 |
| WO | WO 2015/091813 A1 | 6/2015 |
| WO | WO 2015/120168 A1 | 8/2015 |
| WO | WO 2015/142492 A1 | 9/2015 |

OTHER PUBLICATIONS

European Search Report dated Feb. 16, 2012, for corresponding Application No. EP07852089.7.
Gibson, D.W., et al., "Additive Manufacturing Technologies: Rapid Prototyping to Direct Digital Manufacturing", 2010, pp. 126-129, Springer, New York.
Guibas, Leonidas J., et al., "Randomized Incremental Construction of Delaunay and Voronoi Diagrams", Algorithmica, Jun. 1992, pp. 381-413, vol. 7, Issue 1-6, Springer-Verlag, New York.
International Preliminary Examining Authority (IPEA), Second Written Opinion for International Application No. PCT/EP2012/076025, dated Dec. 4, 2013, 4 pages European Patent Office, Germany.
International Preliminary Examining Authority, International Preliminary Report on Patentability for International Application No. PCT/EP2012/076025, including Applicant's Sep. 10, 2013 Response to the ISA's May 17, 2013 Written Opinion and Applicant's Jan. 14, 2014 Response to the IPEA's Second Written Opinion, dated Apr. 4, 2014, 15 pages, European Patent Office, Germany.
International Preliminary Examining Authority, International Preliminary Report on Patentability for International Application No. PCT/EP2012/074383, including Applicant's Sep. 6, 2013 Reply to ISA's Feb. 27, 2013 Written Opinion, dated Jan. 20, 2014, 16 pages, European Patent Office, The Netherlands.
International Preliminary Report on Patentability, dated Nov. 27, 2009, of corresponding international application No. PCT/SE2007/001084.
International Search Report dated Apr. 9, 2010 for Application No. PCT/SE2009/050901.
International Search Report dated Sep. 17, 2008 for Application No. PCT/SE2008/000007.
International Search Report dated Sep. 2, 2008 of corresponding international application No. PCT/SE2007/001084.
International Searching Authority (ISA), International Search Report and Written Opinion for International Application No. PCT/EP2012/076025, dated May 17, 2013, 11 pages, European Patent Office, The Netherlands.
International Searching Authority, International Search Report and Written Opinion for International Application No. PCT/EP2012/074383, dated Feb. 27, 2013, 10 pages, European Patent Office, The Netherlands.
International Searching Authority, International Search Report for International Application No. PCT/SE2011/050093, dated Oct. 20, 2011, 5 pages, The Swedish Patent and Registration Office, Sweden.
International Searching Authority, International Search Report for International Application No. PCT/EP2012/057470, dated Jan. 24, 2013, 1 page, European Patent Office, The Netherlands.
International Searching Authority, International Search Report for International Application No. PCT/EP2012/058733, dated Mar. 5, 2013, 4 pages, European Patent Office, The Netherlands.
Klassen, Alexander, et al., "Modelling of Electron Beam Absorption in Complex Geometries", Journal of Physics D: Applied Physics, Jan. 15, 2014, 12 pages, vol. 47, No. 6, Institute of Physics Publishing Ltd., Great Britain.
Motojima, Seiji, et al., "Chemical Vapor Growth of LaB6 Whiskers and Crystals Having a Sharp Tip", Journal of Crystal Growth, vol. 44, No. 1, Aug. 1, 1978 (Aug. 1, 1978), pp. 106-109.
United States Patent and Trademark Office, Office Action for U.S. Appl. No. 14/636,607, dated Sep. 5, 2017, 16 pages, U.S.A.
United States Patent and Trademark Office, Office Action for U.S. Appl. No. 14/636,607, dated Jun. 1, 2017, 37 pages, U.S.A.
United States Patent and Trademark Office, Office Action for U.S. Appl. No. 15/466,212, dated Sep. 1, 2017, 14 pages, U.S.A.
United States Patent and Trademark Office, Office Action for U.S. Appl. No. 15/466,212, dated May 31, 2017, 17 pages, U.S.A.
United States Patent and Trademark Office, Notice of Allowance for U.S. Appl. No. 15/466,212, dated Mar. 13, 2018, 8 pages, U.S.A.
United States Patent and Trademark Office, Notice of Allowance for U.S. Appl. No. 15/921,381, dated Jul. 31, 2018, U.S.A.
United States Patent and Trademark Office, Notice of Allowance for U.S. Appl. No. 15/921,401, dated Jul. 19, 2018, U.S.A.
Weigel, T.H., et al., "Design and Preparation of Polymeric Scaffolds for Tissue Engineering," Expert Rev. Med. Devices, 2006, pp. 835-851, vol. 3, No. 6, XP002691485.
Yang, et al., "The Design of Scaffolds for Use in Tissue Engineering, Part II, Rapid Prototyping Techniques", Tissue Engineering, 2002, pp. 1-11, vol. 8, No. 1, XP002691484.
International Search Report and Written Opinion for application PCT/EP2015/054626 dated Jun. 19, 2015 (13 pages).
English Translation of Japanese office action for application 2016-557110 dated Jul. 16, 2019 (3 pages).

APPARATUS, METHOD, AND COMPUTER PROGRAM PRODUCT FOR FUSING A WORKPIECE

CROSS-REFERENCE TO RELATED APPLICATIONS

This application is a divisional patent application of U.S. Nonprovisional patent application Ser. No. 15/921,401, filed Mar. 14, 2018, which application is a continuation patent application of U.S. Nonprovisional patent application Ser. No. 15/466,212, filed Mar. 22, 2017 and now U.S. Pat. No. 9,950,367, which application is a divisional patent application of U.S. Nonprovisional patent application Ser. No. 14/636,607, filed Mar. 3, 2015, which application further claims priority to and the benefit of U.S. Provisional Patent Application Ser. No. 61/974,304, filed Apr. 2, 2014, the contents of all of which as are hereby incorporated by reference in their entirety.

BACKGROUND

Related Field

Various embodiments of the present invention relates to a method for welding a workpiece and a method for forming a three-dimensional article. Associated apparatuses and computer program products are also provided.

Description of Related Art

Freeform fabrication or additive manufacturing is a method for forming three-dimensional articles through successive fusion of chosen parts of powder layers applied to a worktable. A method and apparatus according to this technique is disclosed in US 2009/0152771.

Such an apparatus may comprise a work table on which the three-dimensional article is to be formed, a powder dispenser, arranged to lay down a thin layer of powder on the work table for the formation of a powder bed, a ray gun for delivering energy to the powder whereby fusion of the powder takes place, elements for control of the ray given off by the ray gun over the powder bed for the formation of a cross section of the three-dimensional article through fusion of parts of the powder bed, and a controlling computer, in which information is stored concerning consecutive cross sections of the three-dimensional article. A three-dimensional article is formed through consecutive fusions of consecutively formed cross sections of powder layers, successively laid down by the powder dispenser.

There is always a demand for decreasing or minimizing the time for fusing powder material in additive manufacturing or when welding pieces together. One way to increase the efficiency and the speed in AM or when welding in general is to increase the power of the energy beam and at the same time increase the speed of deflection of said energy beam. The deposited power per surface unit can thereby be kept constant but being distributed faster over the surface which is to be fused or welded. However, this only works until a predetermined power and speed of deflection of said energy beam. If increasing the power over a predetermined value, the speed of deflection will be too fast so that the heat from the energy beam will not have sufficient time to penetrate into the material to be fused or welded. With a too high power and thereby a too fast speed of deflection of said energy beam, the surface temperature will become too high so that the material which is to be fused or welded is instead evaporated.

There is a need in the art to beyond that predetermined power and speed of deflection in welding and without evaporating the material which is to be fused or welded.

BRIEF SUMMARY

Having this background, an object of the invention is to provide a method for welding or additive manufacturing with improved efficiency. The above-mentioned object is achieved by the features according to the claims contained herein.

According to various embodiments, a method for welding a workpiece is provided. The method comprising the steps of: making a first weld at a first position on said workpiece with a high energy beam, deflecting the high energy beam with at least one deflection lens for making a second weld at a second position on said workpiece, focusing the high energy beam on said workpiece with at least one focusing lens, shaping the high energy beam on said workpiece with at least one astigmatism lens so that the shape of the high energy beam on said workpiece is longer in a direction parallel to a deflection direction of said high energy beam than in a direction perpendicular to said deflection direction of said high energy beam, wherein a ratio of a length of said high energy beam in said parallel direction and said perpendicular direction is varying as a function of the power of said energy beam on said workpiece.

An advantage of the present invention is that the beam power may be increased substantially or very substantially, as one increases the astigmatism and the scan speed while still fusing the powder or welding the pieces together to a sufficient depth while avoiding evaporation due to excessive temperatures. This may also result in decreased building time. Another advantage of the present invention is that the fusing accuracy or melt width perpendicular to the scanning direction may be kept constant irrespective of the used beam power and scan speed.

In an example embodiment of the present invention said energy beam is a laser beam or an electron beam. A non-limiting advantage of at least this embodiment is that the invention is independent of the energy beam source used.

In still another example embodiment of the present invention a ratio of a length of said high energy beam in said parallel direction and said perpendicular direction may also be varied as a function of the position of said high energy beam on said workpiece. A non-limiting advantage of at least this embodiment is that the protraction of the beam spot may not only be beam power dependent but may also be depending on the pattern which is to be fused.

According to another aspect of the present invention it is provided a method of using an astigmatism lens in additive manufacturing for forming a three-dimensional article through successive fusion, with a high energy beam, of parts of at least one layer of a powder bed provided on a work table, which parts correspond to successive cross sections of the three dimensional article, said astigmatism lens may be used for prolonging the size the high energy beam on said layer of powder bed in a direction parallel to a deflection direction more than in a direction perpendicular to said deflection direction, wherein a ratio of a length of said high energy beam in said parallel direction and said perpendicular direction is varying as a function of the power of said energy beam on said workpiece.

A non-limiting advantage of at least this embodiment is that the method of using the astigmatism lens may be widened from the normal use where the beam spot shape is corrected back to its original shape due to distortions introduced in the lens system between the energy beam source and the target surface. According to the present invention the astigmatism lens system, which may be a true lens system in case of a laser beam and an electrical coil system in case of an electron beam, may be used for shaping the beam so as to protract the beam size in a direction parallel to the deflection direction giving a beam shape which is longer in a direction parallel to the scanning direction compared to a direction perpendicular to said scanning direction. The degree of said protraction is at least varying as a function of the power of said energy beam.

In still another aspect of the present invention it is provided a method for forming a three-dimensional article through successively depositing individual layers of powder material that are fused together so as to form the article, said method comprising the steps of: providing at least one high energy beam source for emitting a high energy beam for at least one of heating or fusing said powder material, providing a deflection source for deflecting the high energy beam on said powder material, providing a focus lens for focusing said high energy beam on said powder material, shaping the high energy beam on said powder layer with at least one astigmatism lens so that the shape of the high energy beam on said layer of powder is longer in a direction parallel to a deflection direction of said high energy beam than in a direction perpendicular to said deflection direction of said high energy beam, wherein a ratio of a length of said high energy beam in said parallel direction and said perpendicular direction is varying as a function of the power of said energy beam on said workpiece.

A non-limiting advantage of various embodiments of the present invention is that the power may be increased substantially or very substantially, the more power the more astigmatism and faster scan speed. This also results in decreased building time for additively manufactured parts. Another advantage of the present invention is that the fusing accuracy or melt width perpendicular to the scanning direction may be kept constant irrespective of the used beam power and scan speed, meaning that the accuracy is not affected when decreasing the building time for additively manufactured parts according to the present invention.

In an example embodiment of the present invention said energy beam is a laser beam or an electron beam. A non-limiting advantage of at least this embodiment is that the invention is independent of the energy beam source used.

In still another example embodiment of the present invention a ratio of a length of said high energy beam in said parallel direction and said perpendicular direction is also varying as a function of the position of said high energy beam on said workpiece. A non-limiting advantage of at least this embodiment is that the protraction of the beam spot is not only beam power dependent but also depending on the pattern which is to be fused.

In yet another example embodiment of the present invention a mean spot size on said workpiece in a direction perpendicular to the scanning direction is smaller than a mean spot size on said workpiece in a direction parallel to the scanning direction for a full scan length, a full cross section and/or for a full 3-dimensional article. A non-limiting advantage of at least this embodiment is that one may choose for which part of the build the mean spot size in a direction parallel to the scanning direction is longer than the mean spot size in a direction perpendicular to the scanning direction.

In yet another example embodiment of the present invention, any of the described methods may be performed, at least in part via execution of one or more computer processors.

In yet another example embodiment of the present invention, an apparatus is provided for forming a three-dimensional article through successively depositing individual layers of powder material that are fused together so as to form the article. The apparatus comprises: at least one high energy beam source for emitting a high energy beam for at least one of heating or fusing said powder material; a deflection source for deflecting the high energy beam on said powder material; a focus lens for focusing said high energy beam on said powder material; at least one astigmatism lens; and at least one controller configured to control said at least one astigmatism lens so as to shape the high energy beam on said powder layer such that the shape of the high energy beam on said layer of powder is longer in a direction parallel to a deflection direction of said high energy beam than in a direction perpendicular to said deflection direction of said high energy beam, wherein a ratio of a length of said high energy beam in said parallel direction and said perpendicular direction is varying as a function of the power of said energy beam on said workpiece.

In yet another example embodiment of the present invention an apparatus for welding a workpiece is provided. The apparatus comprises in certain embodiments: a high energy beam configured to make a first weld at a first position on said workpiece; at least one deflection lens configured to deflect the high energy beam so as to cause the high energy beam to make a second weld at a second position on said workpiece; at least one focusing lens configured to focus the high energy beam on said workpiece; and at least one astigmatism lens; and at least one controller configured to: shape the high energy beam on said workpiece with said at least one astigmatism lens so that the shape of the high energy beam on said workpiece is longer in a direction parallel to a deflection direction of said high energy beam than in a direction perpendicular to said deflection direction of said high energy beam, wherein a ratio of a length of said high energy beam in said parallel direction and said perpendicular direction is varying as a function of the power of said energy beam on said workpiece.

In yet another example embodiment of the present invention a computer program product for forming a three-dimensional article through successively depositing individual layers of powder material that are fused together so as to form the article is provided. The computer program product comprises at least one non-transitory computer-readable storage medium having computer-readable program code portions stored therein. The computer-readable program code portions comprise: an executable portion configured to provide at least one high energy beam source for emitting a high energy beam for at least one of heating or fusing said powder material; an executable portion configured to provide a deflection source for deflecting the high energy beam on said powder material; an executable portion configured to provide a focus lens for focusing said high energy beam on said powder material; and an executable portion configured to shape the high energy beam on said powder layer with at least one astigmatism lens so that the shape of the high energy beam on said layer of powder is longer in a direction parallel to a deflection direction of said high energy beam than in a direction perpendicular to said deflection direction of said high energy beam, wherein a ratio of a length of said high energy beam in said parallel direction and said perpendicular direction is varying as a function of the power of said energy beam on said workpiece.

In yet another example embodiment of the present invention a computer program product for welding a workpiece is provided. The computer program product comprises at least one non-transitory computer-readable storage medium having computer-readable program code portions stored therein. The computer-readable program code portions comprise: an executable portion configured to make a first weld at a first position on said workpiece with a high energy beam; an executable portion configured to deflect the high energy beam with at least one deflection lens for making a second weld at a second position on said workpiece; an executable portion configured to focus the high energy beam on said workpiece with at least one focusing lens; and an executable portion configured to shape the high energy beam on said workpiece with at least one astigmatism lens so that the shape of the high energy beam on said workpiece is longer in a direction parallel to a deflection direction of said high energy beam than in a direction perpendicular to said deflection direction of said high energy beam, wherein a ratio of a length of said high energy beam in said parallel direction and said perpendicular direction is varying as a function of the power of said energy beam on said workpiece.

BRIEF DESCRIPTION OF THE SEVERAL VIEWS OF THE DRAWINGS

Figure 1:
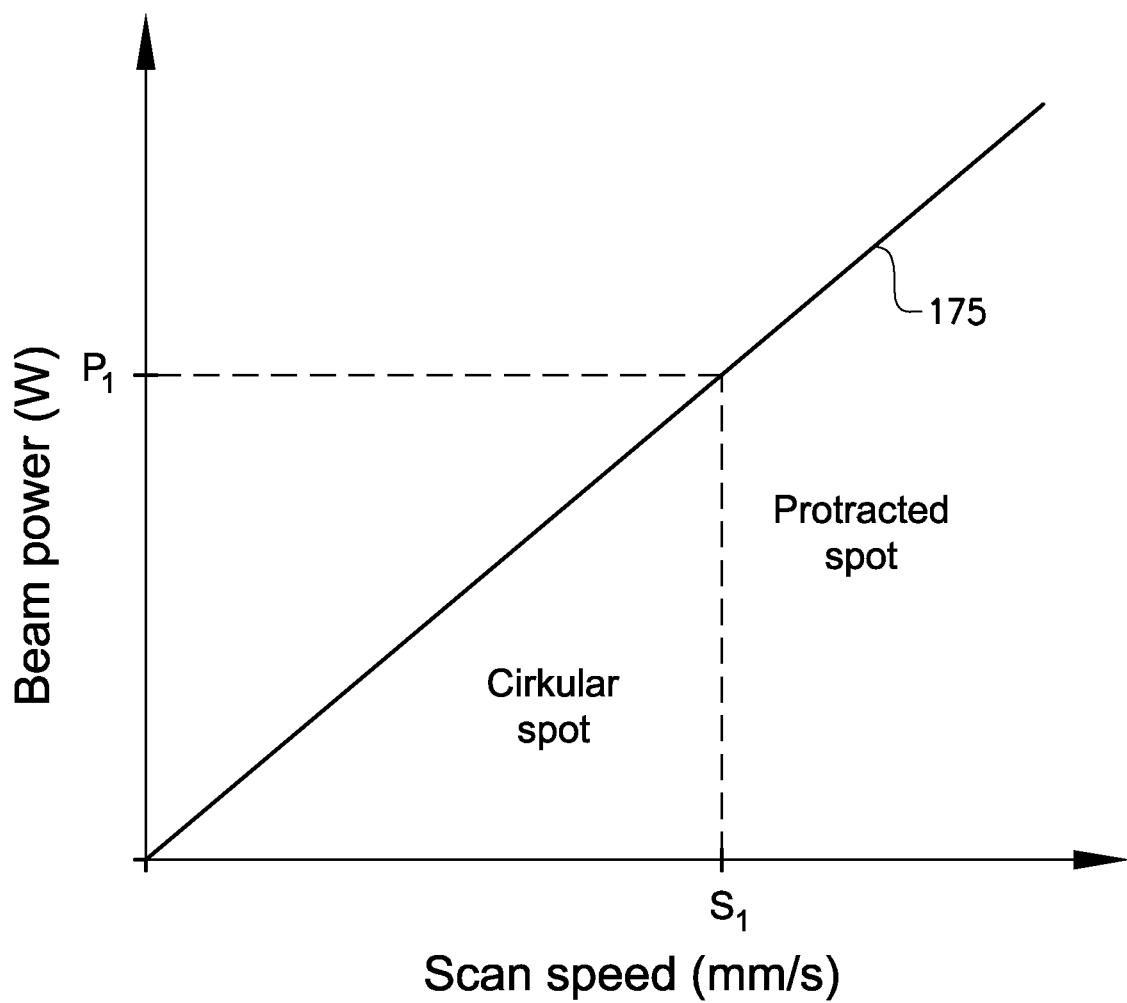
Figure 2:
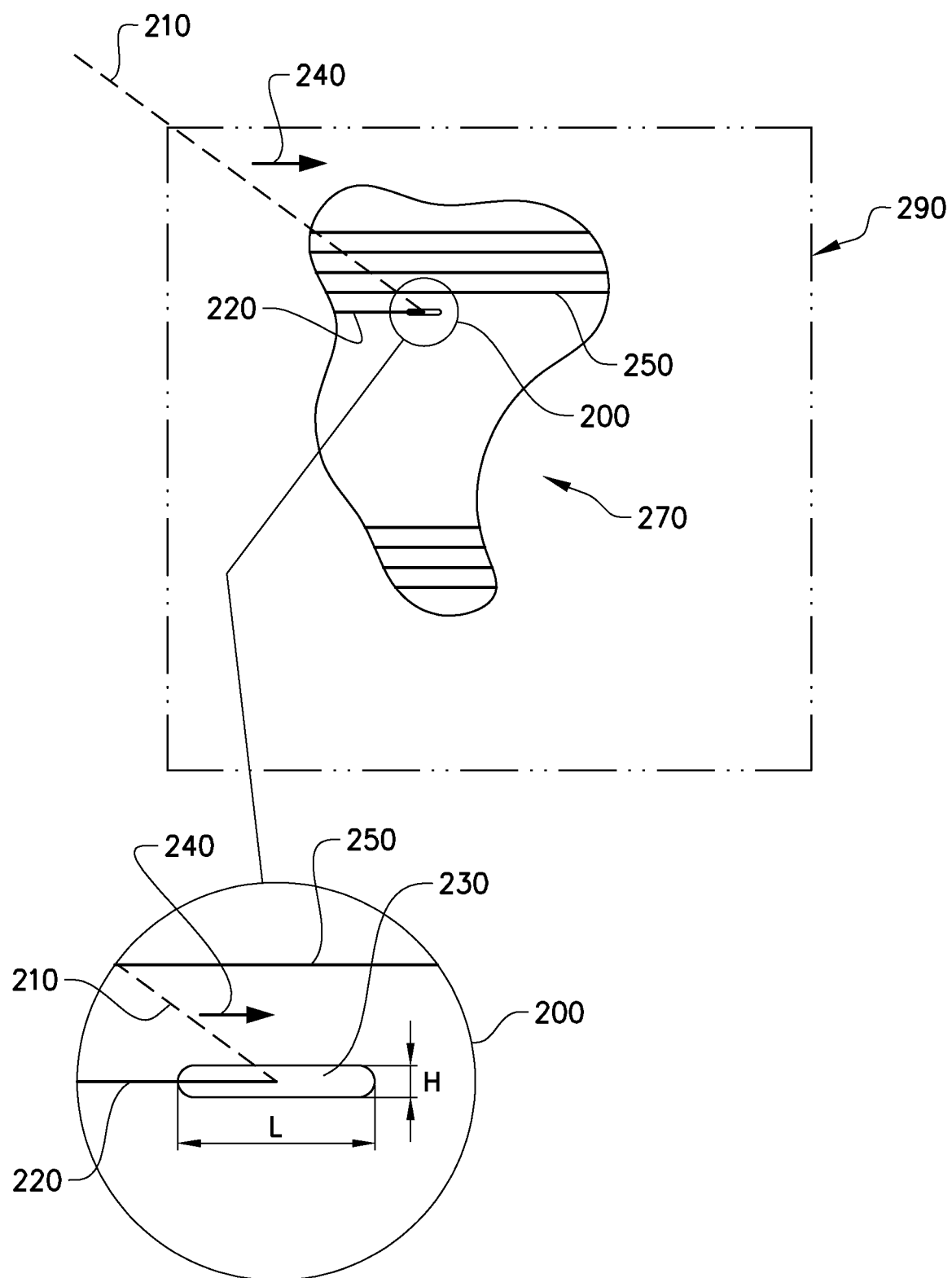
Figure 3:
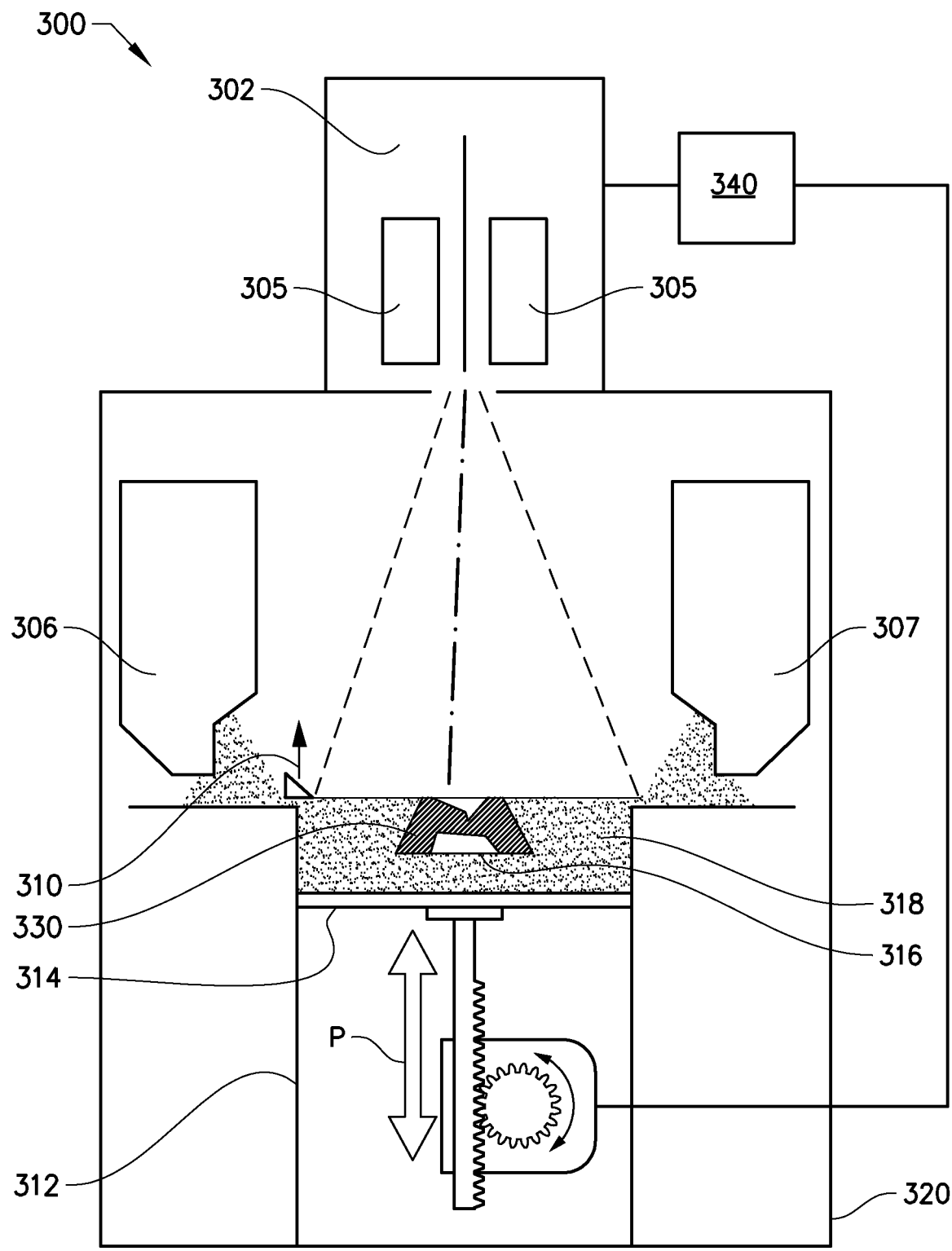
Figure 4A:
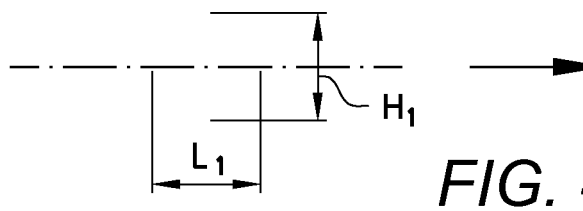
Figure 4B:
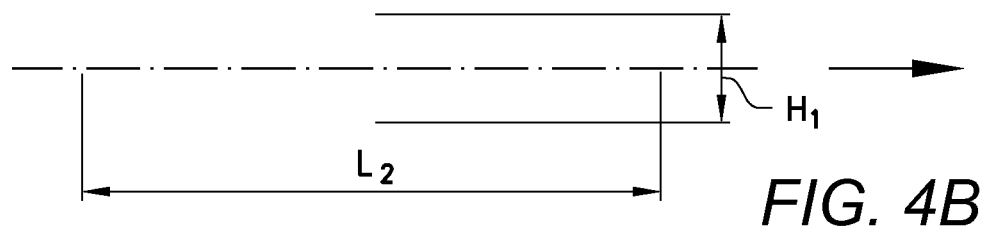
Figure 5A:
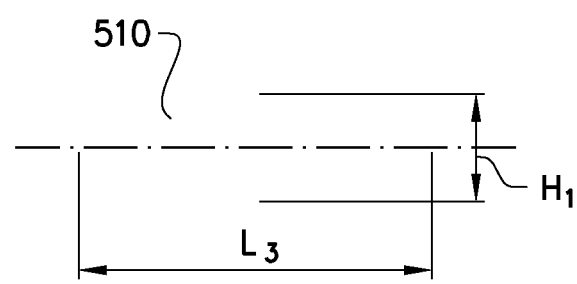
Figure 5B:
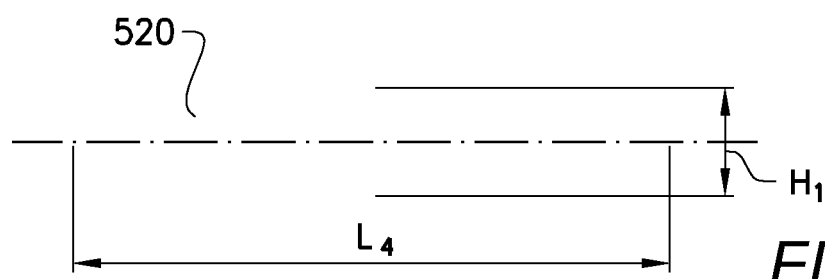
Figure 5C:
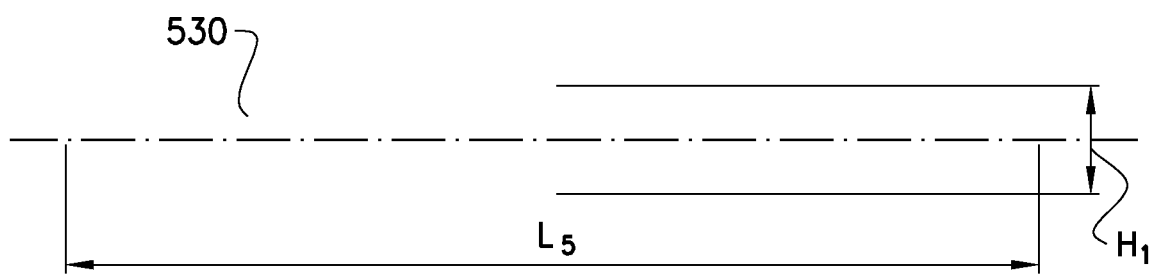
Figure 6:
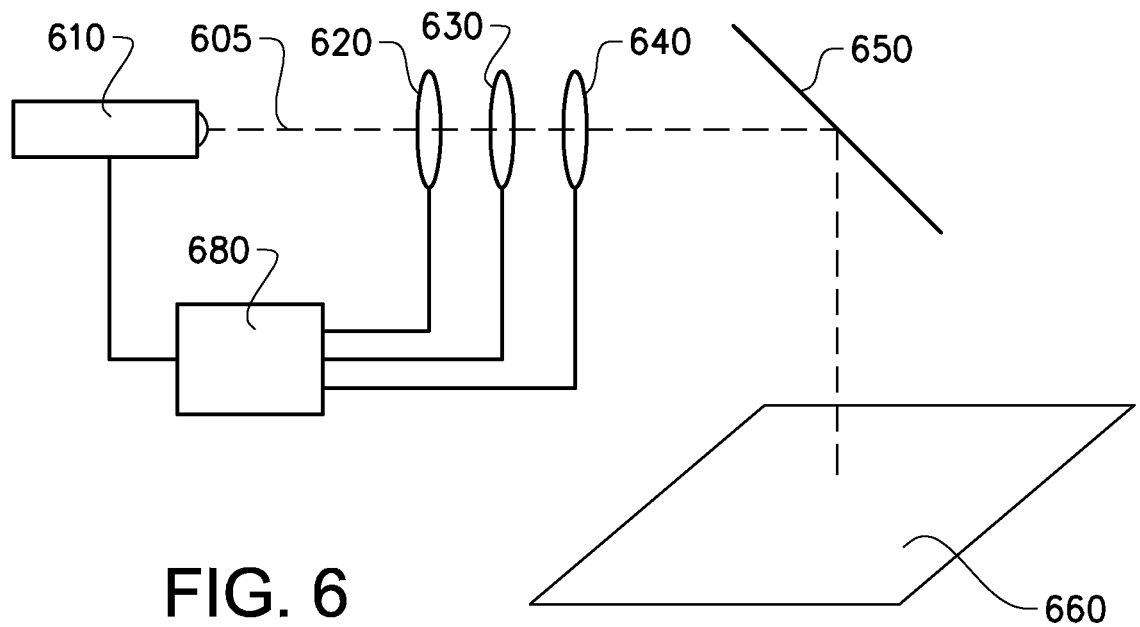
Figure 7:
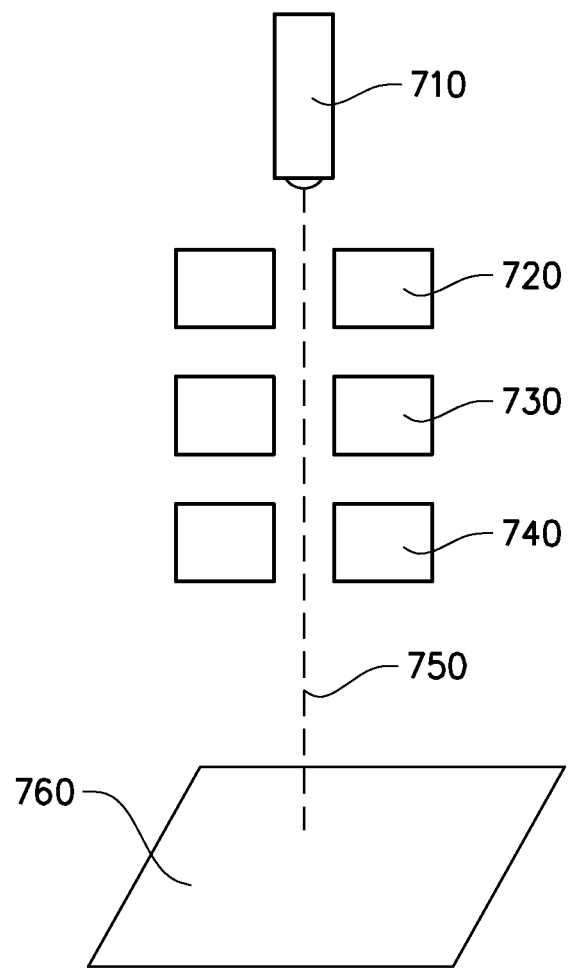
Figure 8:
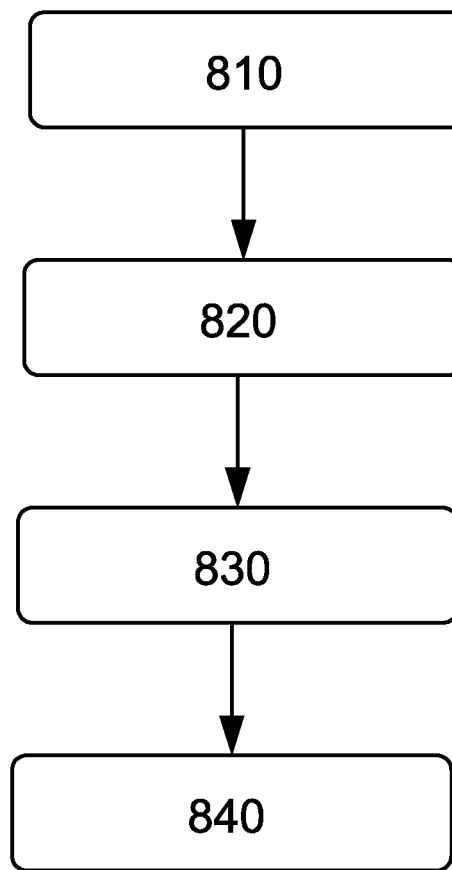

Having thus described the invention in general terms, reference will now be made to the accompanying drawings, which are not necessarily drawn to scale, and wherein:

FIG. 1 depicts a schematic graph of a beam power as a function of scan speed;

FIG. 2 depicts a view from above of an additive manufacturing process with an enlarged view of the beam spot configuration;

FIG. 3 depicts an example embodiment of a freeform fabrication or additive manufacturing apparatus in which the method may be implemented;

FIG. 4A depicts a beam spot configuration according to prior art;

FIG. 4B depicts an example embodiment of a beam spot configuration according to the present invention;

FIG. 5A-5C depicts three different beam spot configurations for different beam power;

FIG. 6 depicts an example embodiment for accomplishing an appropriate beam spot shape in a laser beam based system, FIG. 7 depicts an example embodiment for accomplishing an appropriate beam spot shape in an electron beam based system, and FIG. 8 depicts a schematic flow chart of a method according to the present invention.

Figure 9:
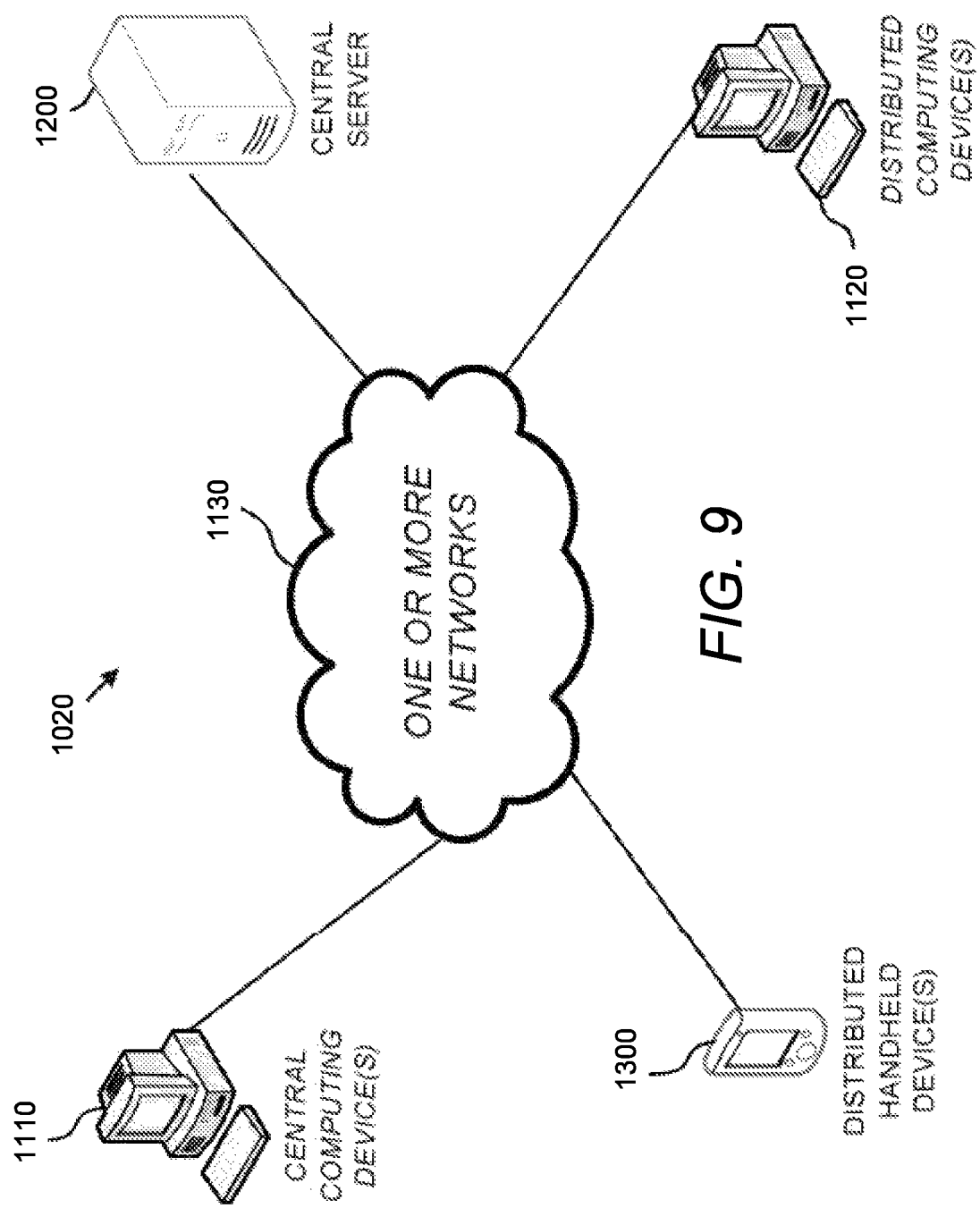
Figure 10A:
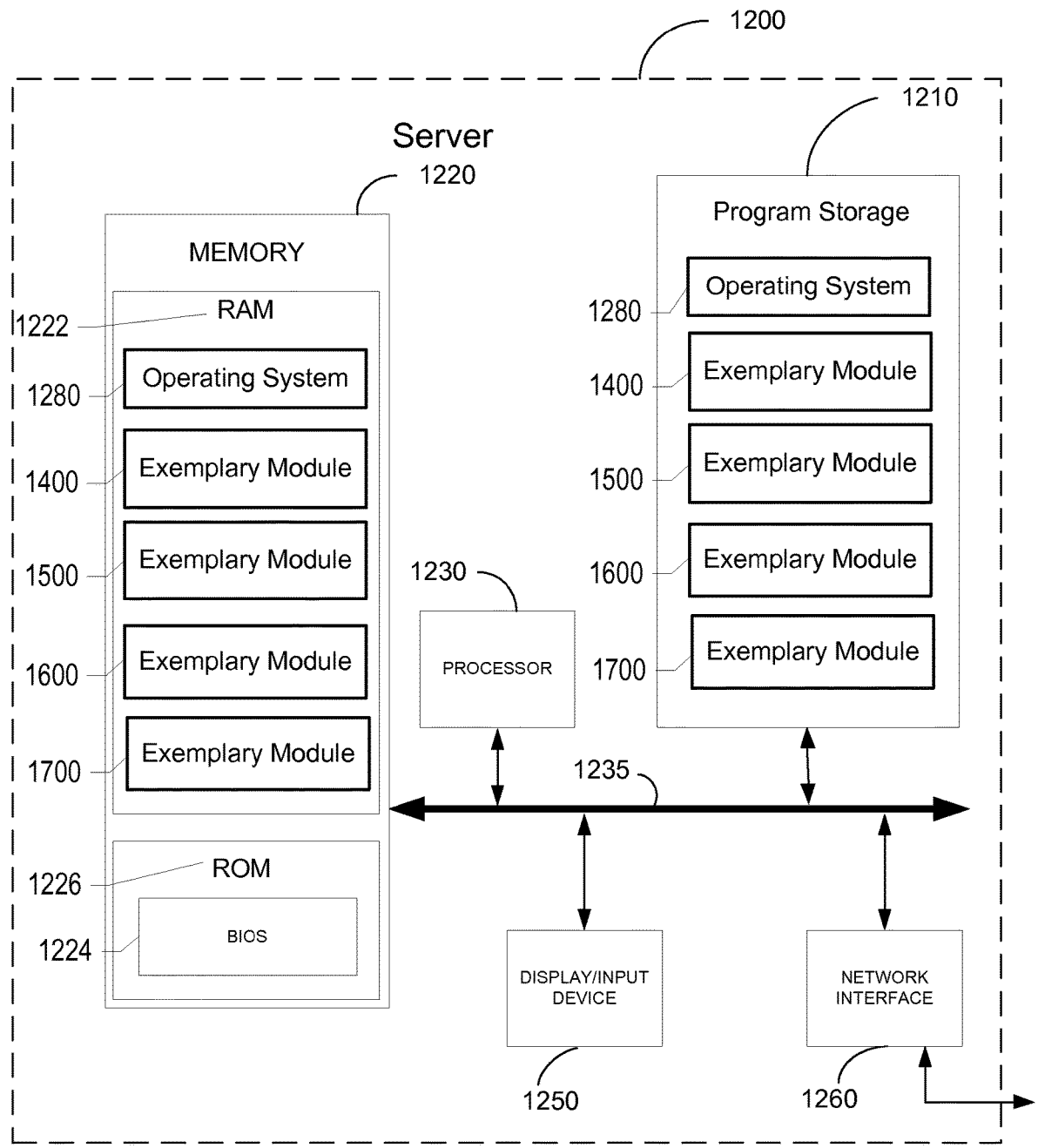
Figure 10B:
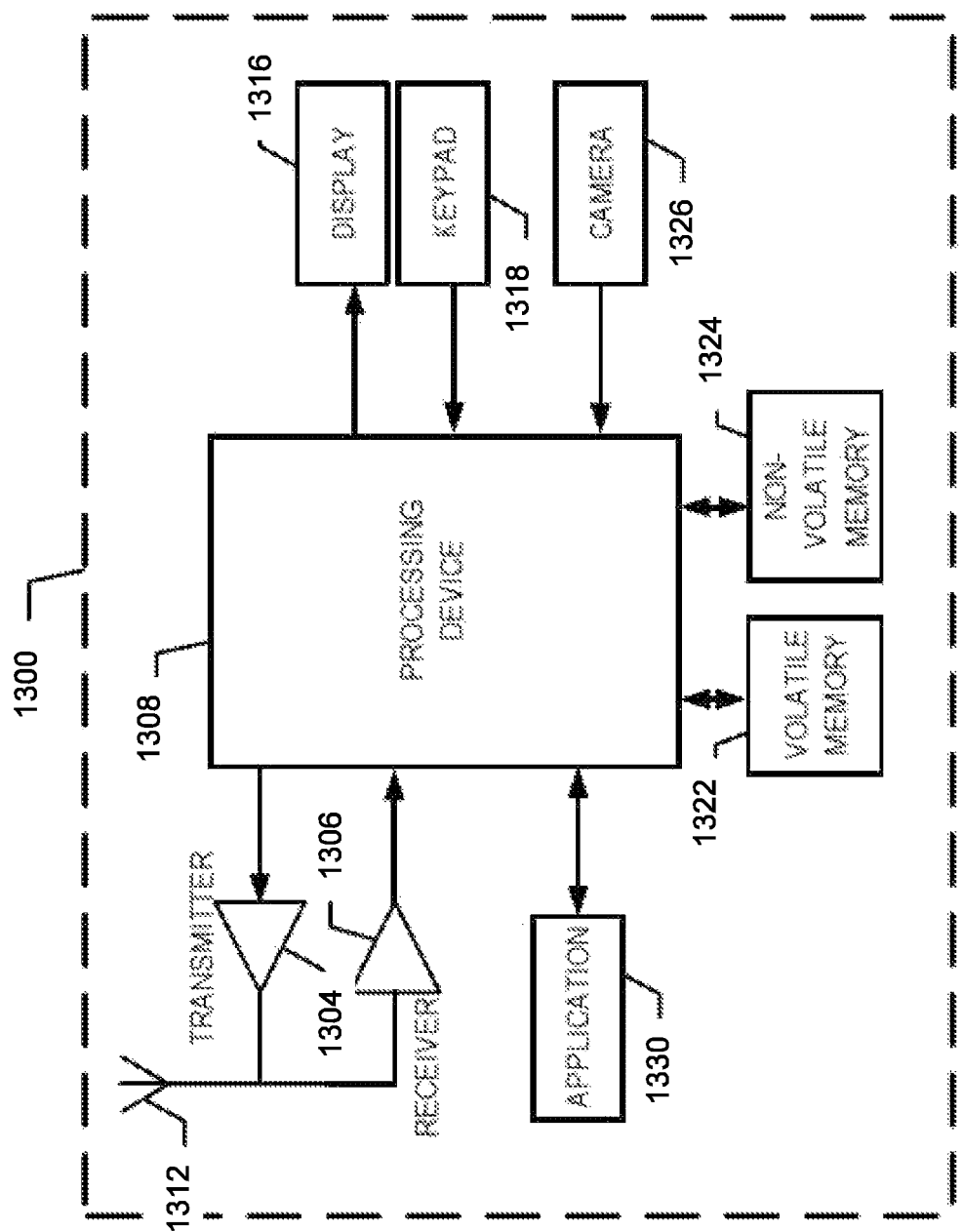

FIG. 9 is a block diagram of an exemplary system 1020 according to various embodiments;

FIG. 10A is a schematic block diagram of a server 1200 according to various embodiments; and FIG. 10B is a schematic block diagram of an exemplary mobile device 1300 according to various embodiments.

DETAILED DESCRIPTION OF VARIOUS EMBODIMENTS

Various embodiments of the present invention will now be described more fully hereinafter with reference to the accompanying drawings, in which some, but not all embodiments of the invention are shown. Indeed, embodiments of the invention may be embodied in many different forms and should not be construed as limited to the embodiments set forth herein. Rather, these embodiments are provided so that this disclosure will satisfy applicable legal requirements. Unless otherwise defined, all technical and scientific terms used herein have the same meaning as commonly known and understood by one of ordinary skill in the art to which the invention relates. The term "or" is used herein in both the alternative and conjunctive sense, unless otherwise indicated. Like numbers refer to like elements throughout.

Still further, to facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

The term "three-dimensional structures" and the like as used herein refer generally to intended or actually fabricated three-dimensional configurations (e.g., of structural material or materials) that are intended to be used for a particular purpose. Such structures, etc. may, for example, be designed with the aid of a three-dimensional CAD system.

The term "electron beam" as used herein in various embodiments refers to any charged particle beam. The sources of charged particle beam can include an electron gun, a linear accelerator and so on.

FIG. 3 depicts an embodiment of a freeform fabrication or additive manufacturing apparatus 300 in which the present method may be implemented. The apparatus 300 comprising an electron gun 302; two powder hoppers 306, 307; a start plate 316; a build tank 312; a powder distributor 310; a build platform 314; beam managing optics 305; and a vacuum chamber 320.

The vacuum chamber 320 is capable of maintaining a vacuum environment by means of a vacuum system, which system may comprise a turbo-molecular pump, a scroll pump, an ion pump and one or more valves which are well known to a skilled person in the art and therefore need no further explanation in this context. The vacuum system is controlled by a control unit 340.

The electron gun 302 is generating an electron beam which is used for melting or fusing together powder material 318 provided on the start plate 316. The electron gun 302 may be provided in or in connection to the vacuum chamber 320. The control unit 340 may be used for controlling and managing the electron beam emitted from the electron beam gun 302. The beam managing optics may comprise at least one focusing coil, at least one deflection coil and at least one astigmatism coil which may be electrically connected to the control unit 340. In an example embodiment of the invention the electron gun may generate a focusable electron beam with an accelerating voltage of about 60 kV and with a beam power in the range of 0-10 kW. The pressure in the vacuum chamber may be in the range of $1 \times 10^{-3}$-$1 \times 10^{-6}$ mBar when building the three-dimensional article by fusing the powder layer by layer with the energy beam.

Instead of using one or a plurality of electron beam sources one or a plurality of laser beam sources may be used for generating one or a plurality of laser beams for melting the powder material or for welding pieces together according to the present invention.

The powder hoppers 306, 307 comprise the powder material to be provided on the start plate 316 in the build tank 312. The powder material may for instance be pure metals or metal alloys such as titanium, titanium alloys, aluminum, aluminum alloys, stainless steel, Co—Cr—W alloy, etc. Instead of using two powder hoppers one powder hopper may be used. In another example embodiment another known type of powder feed and/or powder storage may be used.

The powder distributor 310 is arranged to lay down a thin layer of the powder material on the start plate 316. During a work cycle the build platform 314 will be lowered successively in relation to the ray gun, electron beam based or laser beam based, after each added layer of powder material. In order to make this movement possible, the build platform 314 is in one embodiment of the invention arranged movably in vertical direction, i.e., in the direction indicated by arrow P. This means that the build platform 314 starts in an initial position, in which a first powder material layer of necessary thickness has been laid down on the start plate 316. The build platform is thereafter lowered in connection with laying down a new powder material layer for the formation of a new cross section of a three-dimensional article. Means for lowering the build platform 314 may for instance be through a servo engine equipped with a gear, adjusting screws etc.

A three-dimensional article which is formed through successive fusion of parts of a powder bed, which parts corresponds to successive cross sections of the three-dimensional article, comprising a step of providing a model of the three dimensional article. The model may be generated via a CAD (Computer Aided Design) tool.

A first powder layer may be provided on the work table 316 by distributing powder evenly over the worktable according to several methods. One way to distribute the powder is to collect material fallen down from the hopper 306, 307 by a rake system. The rake is moved over the build tank thereby distributing the powder over the start plate. The distance between a lower part of the rake and the upper part of the start plate or previous powder layer determines the thickness of powder distributed over the start plate. The powder layer thickness can easily be adjusted by adjusting the height of the build platform 314.

An energy beam is directed over the work table 316 causing the first powder layer to fuse in selected locations to form a first cross section of the three-dimensional article. The energy beam may be an electron beam or a laser beam. The beam is directed over the work table 316 from instructions given by a control unit 340. In the control unit instructions for how to control the beam gun for each layer of the three-dimensional article is stored.

After a first layer is finished, i.e., the fusion of powder material for making a first layer of the three-dimensional article, a second powder layer is provided on the work table 316. The second powder layer is preferably distributed according to the same manner as the previous layer. A powder distributor in the form of a single rake system, i.e., where one rake is catching powder fallen down from both a left powder hopper 306 and a right powder hopper 307, the rake as such can change design.

After having distributed the second powder layer on the work table 316, the energy beam is directed over the work table causing the second powder layer to fuse in selected locations to form a second cross section of the three-dimensional article. Fused portions in the second layer may be bonded to fused portions of the first layer. The fused portions in the first and second layer may be melted together by melting not only the powder in the uppermost layer but also remelting at least a fraction of a thickness of a layer directly below the uppermost layer.

FIG. 1 depicts a schematic graph 175 of a beam power as a function of scan speed. For beam power lower than a predetermined value an essentially circular beam spot may be used for fusing powder material or for welding pieces together. If increasing the beam power over a predetermined value, and thereby increasing the scan speed over a predetermined value, the material will start to boil instead of melt. The reason for this boiling of material is that the deflection or scan speed of the energy beam will be too fast so that the heat from the energy beam will not have sufficient time to penetrate into the material to be fused or welded. With a too high power and thereby a too fast speed of deflection of said energy beam, the surface temperature will become too high so that the material which is to be fused or welded is instead evaporated.

The invention solves this problem by protracting the spot, i.e., extending the spot dimension parallel to the scan direction and essentially keeping its dimension perpendicular to the scan direction. In FIG. 1 an essentially circular spot may be used for beam power and scan speed below P1 and S1 respectively. For beam power and scan speed above P1 and S1 respectively the beam spot is protracted in the direction parallel to the scan direction. By letting the beam spot being protracted parallel to the scan direction the surface temperature may be decreased since the power in said beam is distributed over a larger area. The heat from the beam spot may, because of this beam power distribution over a larger area, have sufficient time to penetrate into the material and thereby minimizing the radiated energy from the melt pool and thereby minimizing the boiling or evaporation of material. By protracting the beam spot in parallel to the scan direction, larger beam powers may be used compared to if a circular spot would have been used with a maintained resolution of the fusing or welding. The protracted beam spot may follow an intended scanning path so that the longer dimension of said beam spot follows the beam path, i.e., the dimension perpendicular to the scanning direction is smaller than the dimension parallel to the scanning direction irrespective of the direction of the intended beam path.

FIG. 2 depicts a view from above of an additive manufacturing process with an enlarged view 200 of the beam spot configuration. In FIG. 2 a cross section 270 of a three dimensional article is being built by melting powder material inside a build chamber 290 with an energy beam 210. The energy beam 210 is melting the material according to predetermined instructions stored in a control unit. The scan direction in FIG. 2 is denoted by an arrow 240. A number of scan lines 250 have already been provided onto the powder material in order to build the cross section of the three dimensional article. One scan line 220 is being provided onto the powder material and an enlarged view 200 of the beam spot 230 illustrates that the actual length L of the beam spot 230 in parallel to the scan direction 240 is larger than the dimension of the beam spot 230 perpendicular to the scan direction denoted by H.

FIG. 4A illustrates a beam spot shape when using beam power lower than a predetermined value. In FIG. 4A the horizontal size L1 of the beam spot in parallel to the scan direction is essentially equal to the vertical size H1 of the beam spot perpendicular to the scan direction.

FIG. 4B illustrates a beam spot shape when using a beam power higher than said predetermined value. In FIG. 4B the horizontal size L2 of the beam spot in parallel to the scan direction is substantially larger than the vertical size H1 of the beam spot perpendicular to the scan direction. As can be seen the vertical size H1 of the beam spot perpendicular to the scan direction is equal in FIGS. 4A and 4B. Any scan direction may be used, i.e. not only the horizontal scan direction as have been illustrated in the figures. The beam spot size for beam powers larger than a predetermined value may be larger in a direction in parallel to the scan direction than in a direction perpendicular to the scan direction for any scan direction.

FIG. 5A-5C depicts three different beam spot configurations for three different beam power. The first beam spot 510 in FIG. 5A has a first beam power. The second beam spot 520 in FIG. 5B has a second beam power which is higher than said first beam power. The third beam spot 530 in FIG. 5C has a third beam power which is higher than said second beam power. The first length L3 of said first beam spot 510 is shorter than said second length L4 of said second beam spot 520 which is shorter than the third length L5 of said third beam spot 530. The first, second and third beam spot have all the same size H1 perpendicular to the scan direction. In FIG. 5A-5C the shape of the beam spot is illustrated to be elliptical. However, any protracted shape of the beam spot may be used such as rectangular or polygonal or any other suitable mathematical function where the size of the beam spot is protracted in the scanning direction compared to the size perpendicular to the scanning direction.

FIG. 6 depicts an example embodiment of beam management optics in a laser beam based system. A laser beam 605 is emanating from a laser beam source 610. Before reaching a target surface 660 which may be a powder layer in a layer based additive manufacturing process or solid pieces which are about to be welded together, said laser beam 605 is passing through an astigmatism lens system 620, a focusing lens system 630, a deflection lens system 640, and an optional reflective surface 650. A control unit 680 may be controlling the laser beam source 610 and said lens systems 620, 630, 640. The focusing lens 630 system may comprise one or a plurality of lenses which may be rotatable and/or tiltable and/or translatable (movable along the optical axis) with respect to an optical axis. The focusing lens system 630 may be creating a predetermined beam spot size on the target surface 660. The lenses in the focusing lens system 630 may be fully or partially transparent. The deflection lens system 640 may comprise one or a plurality of lenses which may be rotatable and/or tiltable and/or translatable (movable along the optical axis) with respect to an optical axis. The deflection lens system 640 may position the beam spot at any predetermined position within given limitations, which are defined by the maximum deflection of the beam spot, at said target surface 660.

The astigmatism lens system 620 may comprise one or a plurality of lenses which may be rotatable and/or tiltable and/or translatable (movable along the optical axis) with respect to an optical axis. When a beam is deflected certain aberrations is introduced into the beam spot which is depending on the degree of deflection. The beam is more or less distorted depending on the degree of deflection which may be compensated by the astigmatism lens system 620. According to the present invention said beam spot may not only be compensated for distortions which may be introduced by the other lens systems, but said astigmatism lens system 620 may also intentionally distorting the beam spot shape so as to protract the beam spot in a direction parallel to the direction of beam deflection. The degree of protraction in said direction parallel to said deflection direction may at least be depending on the beam power of said energy beam.

In an example embodiment said beam spot shape is protracted parallel to said deflection direction as a linearly function of said beam power above a predetermined beam power. In another example embodiment said beam spot shape is protracted parallel to said deflection direction as a polynomial function of said beam power above a predetermined beam power.

FIG. 7 depicts an example embodiment of beam management optics in a electron beam based system. An electron beam 750 is emanating from an electron beam source 710. Before reaching a target surface 760, which may be a powder layer in a layer based additive manufacturing process or solid pieces which are about to be welded together, said electron beam 750 may be passing through a astigmatism lens system 720, a focusing lens system 730, an deflection lens system 740. A control unit 680 may control the electron beam source and said beam shaping optics. The focusing lens system 730 may comprise one or a plurality of focusing coils. The focusing lens system 730 may create a predetermined beam spot size on the target surface 760.

The deflection lens system 740 may comprise one or a plurality of deflection coils. The deflection lens system 740 may position the beam spot at any predetermined position within given limitations, which are defined by the maximum deflection of the beam spot, at said target surface 760.

The astigmatism lens system 720 may comprise one or a plurality of astigmatism coils. When a beam is deflected certain aberrations is introduced into the beam spot which is depending on the degree of deflection. The beam may be more or less distorted depending on the degree of deflection which may be compensated by the astigmatism lens system 720. According to the present invention said beam spot is not only compensated for distortions, which may be introduced by the other lens systems, but said astigmatism lens system 720 may also intentionally distort the beam spot shape so as to protract the beam spot in a direction parallel to the direction of beam deflection. The degree of protraction in said direction parallel to said deflection direction may at least be depending on the beam power of said energy beam. In an example embodiment said beam spot shape may be protracted parallel to said deflection direction as a linearly function of said beam power above a predetermined beam power. In another example embodiment said beam spot shape may be protracted parallel to said deflection direction as a polynomial function of said beam power above a predetermined beam power. In an example embodiment a plurality of astigmatism lenses may be used for generating an arbitrary orientation of said protracted beam in any position of the workpiece.

In a laser beam based and electron beam based system said protraction parallel to the deflection direction may not only depend on the power of said energy beam but also on the position on said target surface. More particularly said protraction of said energy beam may depend, in addition to said energy beam power, on the actual fusing or welding position of said energy beam spot on said target surface. In an additive manufacturing process, said protraction may depend on the actual position of said energy beam spot with respect to said pattern which is to be fused, i.e., a more protracted beam spot may be used in the middle section of a scan length compared to at the start or stop position of the scan line. If melting a contour the protraction may be altered during the melting of said contour depending on the derivate of the contour and the distance to said contour derivate. In an example embodiment the protraction, power and scan speed of the beam spot on said workpiece may be chosen so as to optimize the build time.

FIG. 8 depicts a schematic flow chart of a method according to the present invention for welding a workpiece or for fusing together powder material according to a predetermined scheme for building a three dimensional article layer by layer. In a first step denoted 810 a first weld is made at a first position on said workpiece or powder surface with a high energy beam. In a second step denoted 820 the high energy beam is deflected with at least one deflection lens for making a second weld at a second position on said workpiece or said powder surface. In a third step denoted 830 the high energy beam is focused on said workpiece with at least one focusing lens. In a fourth step denoted 840 the high energy beam is shaped on said workpiece or powder surface with at least one astigmatism lens so that the shape of the high energy beam on said workpiece is longer in a direction parallel to a deflection direction of said high energy beam than in a direction perpendicular to said deflection direction of said high energy beam, wherein a ratio of a length of said high energy beam in said parallel direction and said perpendicular direction is varying as a function of the power of said energy beam on said workpiece. An increased power of the beam spot on said workpiece will demand for higher scan speed of said beam spot on said workpiece.

The ratio of said length in said parallel direction and said length in said perpendicular direction with respect to said deflection direction of said energy beam may be one of a group of 5, 10, 15 or 20. In an example embodiment said length in said parallel direction and said perpendicular direction is essentially equal for beam power below a predetermined value which will not cause evaporation of the material to fuse with a predetermined weld or fusing width, since the speed and powder of said beam spot on said workpiece will not cause evaporation of the workpiece material.

In an example embodiment of the present invention a mean spot size on said workpiece in a direction perpendicular to the scanning direction is smaller than the mean spot size on said workpiece in a direction parallel to the scanning direction for a full scan length, a full cross section and/or for a full 3-dimensional article.

Fusing or welding with a protracted beam spot may have the effect of using higher beam spot power and higher beam scanning speed. A protracted beam spot may decrease the surface temperature for a given scanning speed compared with a circular spot having the same power and a diameter equal to the smaller dimension of the protracted beam spot. A protracted beam spot may allow for a higher scanning speed with preserved resolution in a direction perpendicular to the scanning direction compared with a circular spot having a diameter equal to the smaller dimension of the protracted beam spot. A protracted beam spot may allow for heat to penetrate into the material instead of evaporating the material as may be the case with a circular spot. A protracted beam spot may decrease the manufacturing time for an additively manufactured 3-dimensional article compared with a circular spot having the same power and a diameter equal to the smaller dimension of the protracted beam spot.

In another aspect of the invention it is provided a program element configured and arranged when executed on a computer to implement a method for forming at least one three-dimensional article through successive fusion of parts of a powder bed, which parts correspond to successive cross sections of the three-dimensional article, the method comprising the steps of: providing a model of the at least one three-dimensional article; applying a first powder layer on a work table; directing a first energy beam from a first energy beam source over the work table so as to cause the first powder layer to fuse in first selected locations according to corresponding models so as to form a first cross section of the three-dimensional article, where the first energy beam is configured to fuse at least a first region of a first cross section with two or more parallel scan lines in a first direction; and determining a distance between two adjacent of the two or more parallel scan lines, which are used for fusing the powder layer, as a function of a length of at least one of the two adjacent scan lines. The program element may be installed in a computer readable storage medium. The computer readable storage medium may be any control unit as described elsewhere herein or another separate and distinct control unit. The computer readable storage medium and the program element, which may comprise computer-readable program code portions embodied therein, may further be contained within a non-transitory computer program product. Further details regarding these features and configurations are provided, in turn, below.

As mentioned, various embodiments of the present invention may be implemented in various ways, including as non-transitory computer program products. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory VRAM, cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like, as have been described elsewhere herein. As such, embodiments of the present invention may take the form of an apparatus, system, computing device, computing entity, and/or the like executing instructions stored on a computer-readable storage medium to perform certain steps or operations. However, embodiments of the present invention may also take the form of an entirely hardware embodiment performing certain steps or operations.

Various embodiments are described below with reference to block diagrams and flowchart illustrations of apparatuses, methods, systems, and computer program products. It should be understood that each block of any of the block diagrams and flowchart illustrations, respectively, may be implemented in part by computer program instructions, e.g., as logical steps or operations executing on a processor in a computing system. These computer program instructions may be loaded onto a computer, such as a special purpose computer or other programmable data processing apparatus to produce a specifically-configured machine, such that the instructions which execute on the computer or other programmable data processing apparatus implement the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the functionality specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide operations for implementing the functions specified in the flowchart block or blocks.

Accordingly, blocks of the block diagrams and flowchart illustrations support various combinations for performing the specified functions, combinations of operations for performing the specified functions and program instructions for performing the specified functions. It should also be understood that each block of the block diagrams and flowchart illustrations, and combinations of blocks in the block diagrams and flowchart illustrations, could be implemented by special purpose hardware-based computer systems that perform the specified functions or operations, or combinations of special purpose hardware and computer instructions.

FIG. 9 is a block diagram of an exemplary system 1020 that can be used in conjunction with various embodiments of the present invention. In at least the illustrated embodiment, the system 1020 may include one or more central computing devices 1110, one or more distributed computing devices 1120, and one or more distributed handheld or mobile devices 1300, all configured in communication with a central server 1200 (or control unit) via one or more networks 1130. While FIG. 9 illustrates the various system entities as separate, standalone entities, the various embodiments are not limited to this particular architecture.

According to various embodiments of the present invention, the one or more networks 1130 may be capable of supporting communication in accordance with any one or more of a number of second-generation (2G), 2.5G, third-generation (3G), and/or fourth-generation (4G) mobile communication protocols, or the like. More particularly, the one or more networks 1130 may be capable of supporting communication in accordance with 2G wireless communication protocols IS-136 (TDMA), GSM, and IS-95 (CDMA). Also, for example, the one or more networks 1130 may be capable of supporting communication in accordance with 2.5G wireless communication protocols GPRS, Enhanced Data GSM Environment (EDGE), or the like. In addition, for example, the one or more networks 1130 may be capable of supporting communication in accordance with 3G wireless communication protocols such as Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present invention, as should dual or higher mode mobile stations (e.g., digital/analog or TDMA/CDMA/analog phones). As yet another example, each of the components of the system 1020 may be configured to communicate with one another in accordance with techniques such as, for example, radio frequency (RF), Bluetooth™, infrared (IrDA), or any of a number of different wired or wireless networking techniques, including a wired or wireless Personal Area Network ("PAN"), Local Area Network ("LAN"), Metropolitan Area Network ("MAN"), Wide Area Network ("WAN"), or the like.

Although the device(s) 1110-1300 are illustrated in FIG. 9 as communicating with one another over the same network 1130, these devices may likewise communicate over multiple, separate networks.

According to one embodiment, in addition to receiving data from the server 1200, the distributed devices 1110, 1120, and/or 1300 may be further configured to collect and transmit data on their own. In various embodiments, the devices 1110, 1120, and/or 1300 may be capable of receiving data via one or more input units or devices, such as a keypad, touchpad, barcode scanner, radio frequency identification (RFID) reader, interface card (e.g., modem, etc.) or receiver. The devices 1110, 1120, and/or 1300 may further be capable of storing data to one or more volatile or non-volatile memory modules, and outputting the data via one or more output units or devices, for example, by displaying data to the user operating the device, or by transmitting data, for example over the one or more networks 1130.

In various embodiments, the server 1200 includes various systems for performing one or more functions in accordance with various embodiments of the present invention, including those more particularly shown and described herein. It should be understood, however, that the server 1200 might include a variety of alternative devices for performing one or more like functions, without departing from the spirit and scope of the present invention. For example, at least a portion of the server 1200, in certain embodiments, may be located on the distributed device(s) 1110, 1120, and/or the handheld or mobile device(s) 1300, as may be desirable for particular applications. As will be described in further detail below, in at least one embodiment, the handheld or mobile device(s) 1300 may contain one or more mobile applications 1330 which may be configured so as to provide a user interface for communication with the server 1200, all as will be likewise described in further detail below.

FIG. 10A is a schematic diagram of the server 1200 according to various embodiments. The server 1200 includes a processor 1230 that communicates with other elements within the server via a system interface or bus 1235. Also included in the server 1200 is a display/input device 1250 for receiving and displaying data. This display/input device 1250 may be, for example, a keyboard or pointing device that is used in combination with a monitor. The server 1200 further includes memory 1220, which preferably includes both read only memory (ROM) 1226 and random access memory (RAM) 1222. The server's ROM 1226 is used to store a basic input/output system 1224 (BIOS), containing the basic routines that help to transfer information between elements within the server 1200. Various ROM and RAM configurations have been previously described herein.

In addition, the server 1200 includes at least one storage device or program storage 210, such as a hard disk drive, a floppy disk drive, a CD Rom drive, or optical disk drive, for storing information on various computer-readable media, such as a hard disk, a removable magnetic disk, or a CD-ROM disk. As will be appreciated by one of ordinary skill in the art, each of these storage devices 1210 are connected to the system bus 1235 by an appropriate interface. The storage devices 1210 and their associated computer-readable media provide nonvolatile storage for a personal computer. As will be appreciated by one of ordinary skill in the art, the computer-readable media described above could be replaced by any other type of computer-readable media known in the art. Such media include, for example, magnetic cassettes, flash memory cards, digital video disks, and Bernoulli cartridges.

Although not shown, according to an embodiment, the storage device 1210 and/or memory of the server 1200 may further provide the functions of a data storage device, which may store historical and/or current delivery data and delivery conditions that may be accessed by the server 1200. In this regard, the storage device 1210 may comprise one or more databases. The term "database" refers to a structured collection of records or data that is stored in a computer system, such as via a relational database, hierarchical database, or network database and as such, should not be construed in a limiting fashion.

A number of program modules (e.g., exemplary modules 1400-1700) comprising, for example, one or more computer-readable program code portions executable by the processor 1230, may be stored by the various storage devices 1210 and within RAM 1222. Such program modules may also include an operating system 1280. In these and other embodiments, the various modules 1400, 1500, 1600, 1700 control certain aspects of the operation of the server 1200 with the assistance of the processor 1230 and operating system 1280. In still other embodiments, it should be understood that one or more additional and/or alternative modules may also be provided, without departing from the scope and nature of the present invention.

In various embodiments, the program modules 1400, 1500, 1600, 1700 are executed by the server 1200 and are configured to generate one or more graphical user interfaces, reports, instructions, and/or notifications/alerts, all accessible and/or transmittable to various users of the system 1020. In certain embodiments, the user interfaces, reports, instructions, and/or notifications/alerts may be accessible via one or more networks 1130, which may include the Internet or other feasible communications network, as previously discussed.

In various embodiments, it should also be understood that one or more of the modules 1400, 1500, 1600, 1700 may be alternatively and/or additionally (e.g., in duplicate) stored locally on one or more of the devices 1110, 1120, and/or 1300 and may be executed by one or more processors of the same. According to various embodiments, the modules 1400, 1500, 1600, 1700 may send data to, receive data from, and utilize data contained in one or more databases, which may be comprised of one or more separate, linked and/or networked databases.

Also located within the server 1200 is a network interface 1260 for interfacing and communicating with other elements of the one or more networks 1130. It will be appreciated by one of ordinary skill in the art that one or more of the server 1200 components may be located geographically remotely from other server components. Furthermore, one or more of the server 1200 components may be combined, and/or additional components performing functions described herein may also be included in the server.

While the foregoing describes a single processor 1230, as one of ordinary skill in the art will recognize, the server 1200 may comprise multiple processors operating in conjunction with one another to perform the functionality described herein. In addition to the memory 1220, the processor 1230 can also be connected to at least one interface or other means for displaying, transmitting and/or receiving data, content or the like. In this regard, the interface(s) can include at least one communication interface or other means for transmitting and/or receiving data, content or the like, as well as at least one user interface that can include a display and/or a user input interface, as will be described in further detail below. The user input interface, in turn, can comprise any of a number of devices allowing the entity to receive data from a user, such as a keypad, a touch display, a joystick or other input device.

Still further, while reference is made to the "server" 1200, as one of ordinary skill in the art will recognize, embodiments of the present invention are not limited to traditionally defined server architectures. Still further, the system of embodiments of the present invention is not limited to a single server, or similar network entity or mainframe computer system. Other similar architectures including one or more network entities operating in conjunction with one another to provide the functionality described herein may likewise be used without departing from the spirit and scope of embodiments of the present invention. For example, a mesh network of two or more personal computers (PCs), similar electronic devices, or handheld portable devices, collaborating with one another to provide the functionality described herein in association with the server 1200 may likewise be used without departing from the spirit and scope of embodiments of the present invention.

According to various embodiments, many individual steps of a process may or may not be carried out utilizing the computer systems and/or servers described herein, and the degree of computer implementation may vary, as may be desirable and/or beneficial for one or more particular applications.

FIG. 10B provides an illustrative schematic representative of a mobile device 1300 that can be used in conjunction with various embodiments of the present invention. Mobile devices 1300 can be operated by various parties. As shown in FIG. 10B, a mobile device 1300 may include an antenna 1312, a transmitter 1304 (e.g., radio), a receiver 1306 (e.g., radio), and a processing element 1308 that provides signals to and receives signals from the transmitter 1304 and receiver 1306, respectively.

The signals provided to and received from the transmitter 1304 and the receiver 1306, respectively, may include signaling data in accordance with an air interface standard of applicable wireless systems to communicate with various entities, such as the server 1200, the distributed devices 1110, 1120, and/or the like. In this regard, the mobile device 1300 may be capable of operating with one or more air interface standards, communication protocols, modulation types, and access types. More particularly, the mobile device 1300 may operate in accordance with any of a number of wireless communication standards and protocols. In a particular embodiment, the mobile device 1300 may operate in accordance with multiple wireless communication standards and protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the mobile device 1300 may according to various embodiments communicate with various other entities using concepts such as Unstructured Supplementary Service data (USSD), Short Message Service (SMS), Multimedia Messaging Service (MMS), Dual-Tone Multi-Frequency Signaling (DTMF), and/or Subscriber Identity Module Dialer (SIM dialer). The mobile device 1300 can also download changes, add-ons, and updates, for instance, to its firmware, software (e.g., including executable instructions, applications, program modules), and operating system.

According to one embodiment, the mobile device 1300 may include a location determining device and/or functionality. For example, the mobile device 1300 may include a GPS module adapted to acquire, for example, latitude, longitude, altitude, geocode, course, and/or speed data. In one embodiment, the GPS module acquires data, sometimes known as ephemeris data, by identifying the number of satellites in view and the relative positions of those satellites.

The mobile device 1300 may also comprise a user interface (that can include a display 1316 coupled to a processing element 1308) and/or a user input interface (coupled to a processing element 308). The user input interface can comprise any of a number of devices allowing the mobile device 1300 to receive data, such as a keypad 1318 (hard or soft), a touch display, voice or motion interfaces, or other input device. In embodiments including a keypad 1318, the keypad can include (or cause display of) the conventional numeric (0-9) and related keys (#, *), and other keys used for operating the mobile device 1300 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The mobile device 1300 can also include volatile storage or memory 1322 and/or non-volatile storage or memory 1324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database mapping systems, data, applications, programs, program modules, scripts, source code, object code, byte code, compiled code, interpreted code, machine code, executable instructions, and/or the like to implement the functions of the mobile device 1300.

The mobile device 1300 may also include one or more of a camera 1326 and a mobile application 1330. The camera 1326 may be configured according to various embodiments as an additional and/or alternative data collection feature, whereby one or more items may be read, stored, and/or transmitted by the mobile device 1300 via the camera. The mobile application 1330 may further provide a feature via which various tasks may be performed with the mobile device 1300. Various configurations may be provided, as may be desirable for one or more users of the mobile device 1300 and the system 1020 as a whole.

The invention is not limited to the above-described embodiments and many modifications are possible within the scope of the following claims. Such modifications may, for example, involve using a different source of energy beam than the exemplified electron beam such as a laser beam. Other materials than metallic powder may be used, such as the non-limiting examples of: electrically conductive polymers and powder of electrically conductive ceramics. Indeed, a person of ordinary skill in the art would be able to use the information contained in the preceding text to modify various embodiments of the invention in ways that are not literally described, but are nevertheless encompassed by the attached claims, for they accomplish substantially the same functions to reach substantially the same results. Therefore, it is to be understood that the invention is not limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus for forming an article through successively depositing individual layers of powder material that are fused together to form the article, said apparatus comprising:

a powder distributor configured to lay down a layer of said powder material;

a high energy beam configured to make a first weld at a first position on said powder material;

at least one deflection lens configured to deflect the high energy beam so as to cause the high energy beam to make a second weld at a second position on said powder material;

at least one focusing lens configured to focus the high energy beam on said powder material; and at least one astigmatism lens; and at least one controller configured to:

shape the high energy beam on said powder material with said at least one astigmatism lens so that the shape of the high energy beam on said powder material is longer in a direction parallel to a deflection direction of said high energy beam than in a direction perpendicular to said deflection direction of said high energy beam, wherein:
  a ratio of a length of said high energy beam spot in said parallel direction and a width of said high energy beam spot in said perpendicular direction is varying as a function of the power of said energy beam on said powder material either during a scan of said high energy beam on said powder material or between successive scans of said high energy beam on said powder material; and
  the width of said high energy beam spot in said perpendicular direction is a constant value.

2. The apparatus according to claim 1, wherein said high energy beam is at least one of an electron beam or a laser beam.

3. The apparatus according to claim 1, wherein said deflection source is at least one of a tiltable mirror or a tiltable lens.

4. The apparatus according to claim 1, wherein said deflection source is a deflection coil.

5. The apparatus according to claim 1, wherein the ratio of the length of said high energy beam spot in said parallel direction and the width of said high energy beam spot in said perpendicular direction is also varying as a function of a position of said high energy beam on said powder material.

6. The apparatus according to claim 1, wherein said energy beam spot is at least five (5) times longer in a direction parallel to the deflection direction compared to a direction perpendicular to said deflection direction.

7. The apparatus according to claim 1, wherein said energy beam spot is at least ten (10) times longer in a direction parallel to the deflection direction compared to a direction perpendicular to said deflection direction.

8. The apparatus according to claim 1, wherein a mean spot size on said powder material in a direction perpendicular to the scanning direction is smaller than a mean spot size on said powder material in a direction parallel to the scanning direction for a full scan length, a full cross section and/or for a full 3-dimensional article.

9. A computer program product for forming an article through successively depositing individual layers of powder material that are fused together to form the article, the computer program product comprising at least one non-transitory computer-readable storage medium having computer-readable program code portions stored therein, the computer readable program code portions comprising one or more executable portions configured to:
  make a first weld at a first position on said powder material with a high energy beam;
  deflect the high energy beam with at least one deflection lens for making a second weld at a second position on said powder material;
  focus the high energy beam on said powder material with at least one focusing lens; and
  shape the high energy beam on said powder material with at least one astigmatism lens so that the shape of the high energy beam on said powder material is longer in a direction parallel to a deflection direction of said high energy beam than in a direction perpendicular to deflection direction of said high energy beam, wherein:
    a ratio of a length of said high energy beam spot in said parallel direction and a width of said high energy beam spot in said perpendicular direction is varying as a function of the power of said energy beam on said powder material either during a scan of said high energy beam on said powder material or between successive scans of said high energy beam on said powder material; and
    the width of said high energy beam spot in said perpendicular direction is a constant value.

10. The computer program product according to claim 9, wherein said high energy beam is at least one of an electron beam or a laser beam.

11. The computer program product according to claim 9, wherein said deflection source is at least one of a tiltable mirror or a tiltable lens.

12. The computer program product according to claim 9, wherein said deflection source is a deflection coil.

13. The computer program product according to claim 9, wherein the ratio of the length of said high energy beam spot in said parallel direction and the width of said high energy beam spot in said perpendicular direction is also varying as a function of a position of said high energy beam on said powder material.

14. The computer program product according to claim 9, wherein said energy beam spot is at least five (5) times longer in a direction parallel to the deflection direction compared to a direction perpendicular to said deflection direction.

15. The computer program product according to claim 9, wherein said energy beam spot is at least ten (10) times longer in a direction parallel to the deflection direction compared to a direction perpendicular to said deflection direction.

16. The computer program product according to claim 9, wherein a mean spot size on said powder material in a direction perpendicular to the scanning direction is smaller than a mean spot size on said powder material in a direction parallel to the scanning direction for a full scan length, a full cross section and/or for a full 3-dimensional article.

17. The computer program product according to claim 9, wherein one or more of the steps of deflecting, focusing, and shaping the high energy beam are performed via execution of one or more computer processors.

* * * * *